(12) United States Patent
Sankrithi

(10) Patent No.: US 9,546,643 B2
(45) Date of Patent: Jan. 17, 2017

(54) REVOLVING OVERHEAD WINDMILL

(71) Applicant: Mithra M. K. V. Sankrithi, Lake Forest Park, WA (US)

(72) Inventor: Mithra M. K. V. Sankrithi, Lake Forest Park, WA (US)

(73) Assignee: RIC Enterprises, Lake Forest Park, WA (US)

(*) Notice: Subject to any disclaimer, the term of this patent is extended or adjusted under 35 U.S.C. 154(b) by 59 days.

(21) Appl. No.: 14/544,372

(22) Filed: Dec. 31, 2014

(65) Prior Publication Data

US 2016/0186723 A1 Jun. 30, 2016

(51) Int. Cl.
*F03D 5/04* (2006.01)
*F03D 11/00* (2006.01)
*F03D 11/04* (2006.01)

(52) U.S. Cl.
CPC ............ *F03D 5/04* (2013.01); *F03D 11/0033* (2013.01); *F03D 11/045* (2013.01); *F05B 2240/93* (2013.01); *F05B 2240/95* (2013.01)

(58) Field of Classification Search
CPC ..... Y02E 10/723; Y02E 10/721; F03D 7/0204
USPC ........................................ 416/9; 290/53, 44
See application file for complete search history.

(56) References Cited

U.S. PATENT DOCUMENTS

| | | | | |
|---|---|---|---|---|
| 6,417,578 | B1* | 7/2002 | Chapman | F01D 15/10 290/43 |
| 7,604,454 | B2* | 10/2009 | Power, III | F03D 5/04 290/54 |
| 7,750,491 | B2* | 7/2010 | Sankrithi | F03B 13/264 290/43 |
| 8,740,543 | B2* | 6/2014 | Weaver | B63B 35/44 290/44 |
| 2007/0228736 | A1* | 10/2007 | Smushkovich | F03B 13/1845 290/42 |
| 2007/0257491 | A1* | 11/2007 | Kornbluh | F03B 13/1845 290/53 |
| 2008/0240864 | A1* | 10/2008 | Belinsky | E02D 27/42 405/223.1 |
| 2009/0127861 | A1* | 5/2009 | Sankrithi | F03B 13/264 290/54 |
| 2009/0160197 | A1* | 6/2009 | Roskey | F03D 1/04 290/55 |

* cited by examiner

*Primary Examiner* — Tulsidas C Patel
*Assistant Examiner* — Charles Reid, Jr.

(57) ABSTRACT

The revolving overhead windmill includes airfoils that harvest wind energy using a configuration, in the class of vertical axis wind turbines, wherein the airfoils are modestly elevated above a water or ground surface through the use of buoyancy forces and elongated structural members. The airfoil angle of attack is controlled in a periodic manner as each airfoil revolves around a closed circuit of revolution, in order to optimize system energy harvest as measured by metrics such as megawatts of electric power generation under rated wind conditions. Typical large-scale applications in high wind, offshore locations can substantively contribute to utility-scale renewable energy production and also contribute towards climate change mitigation targets.

20 Claims, 20 Drawing Sheets

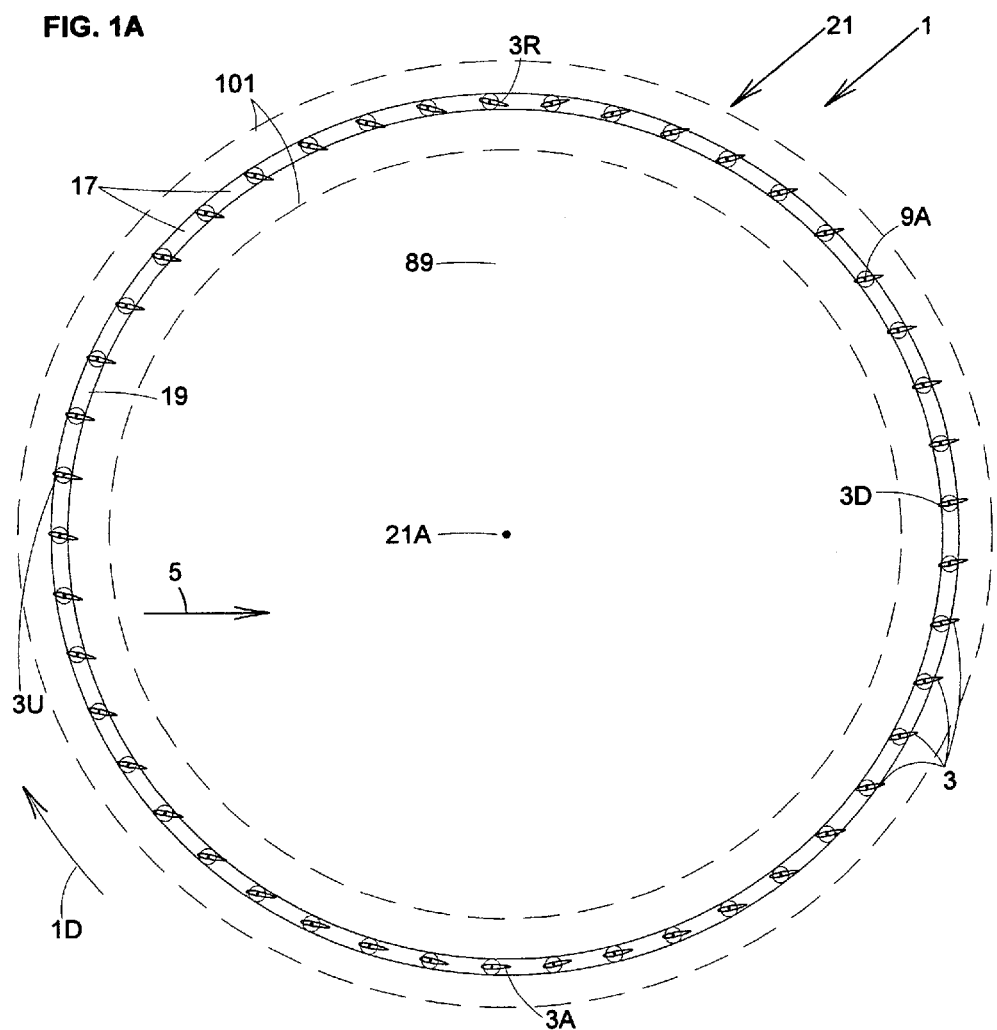

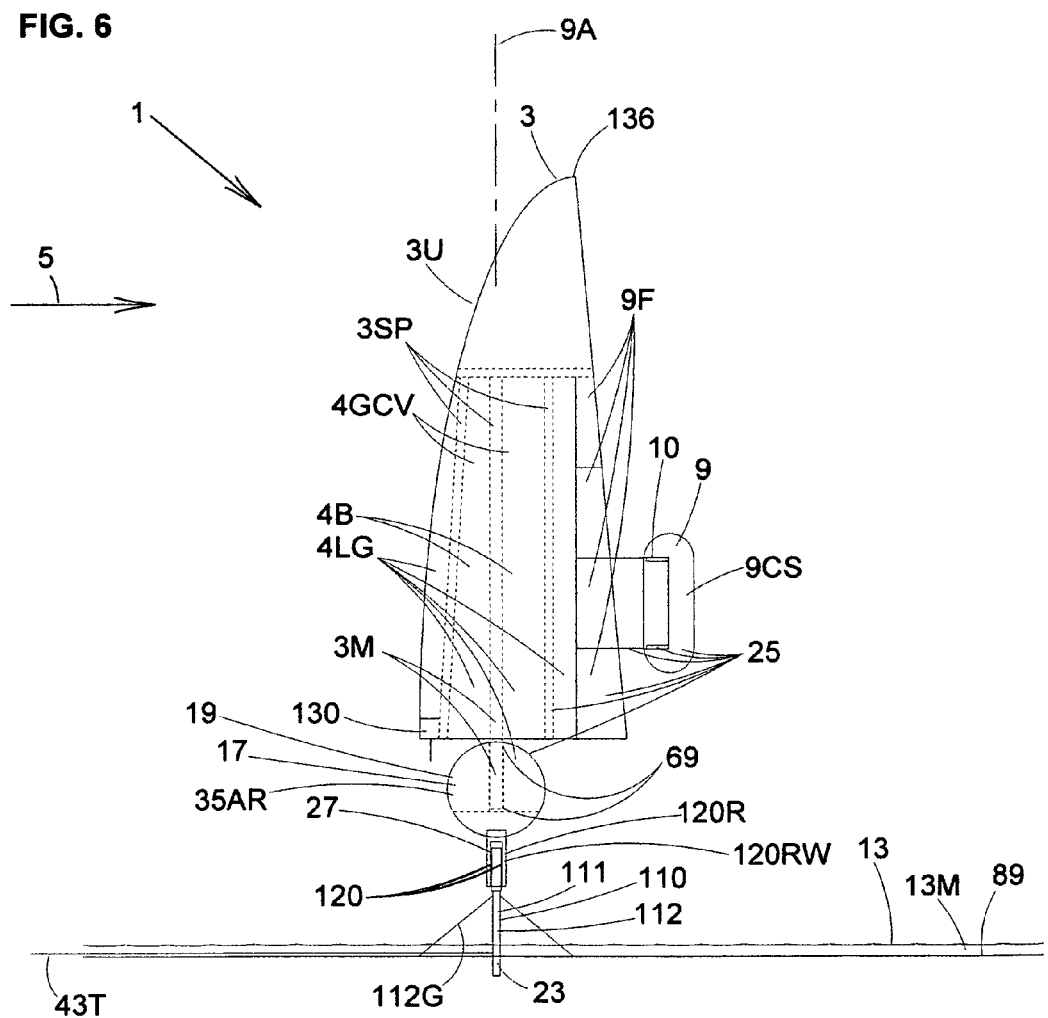

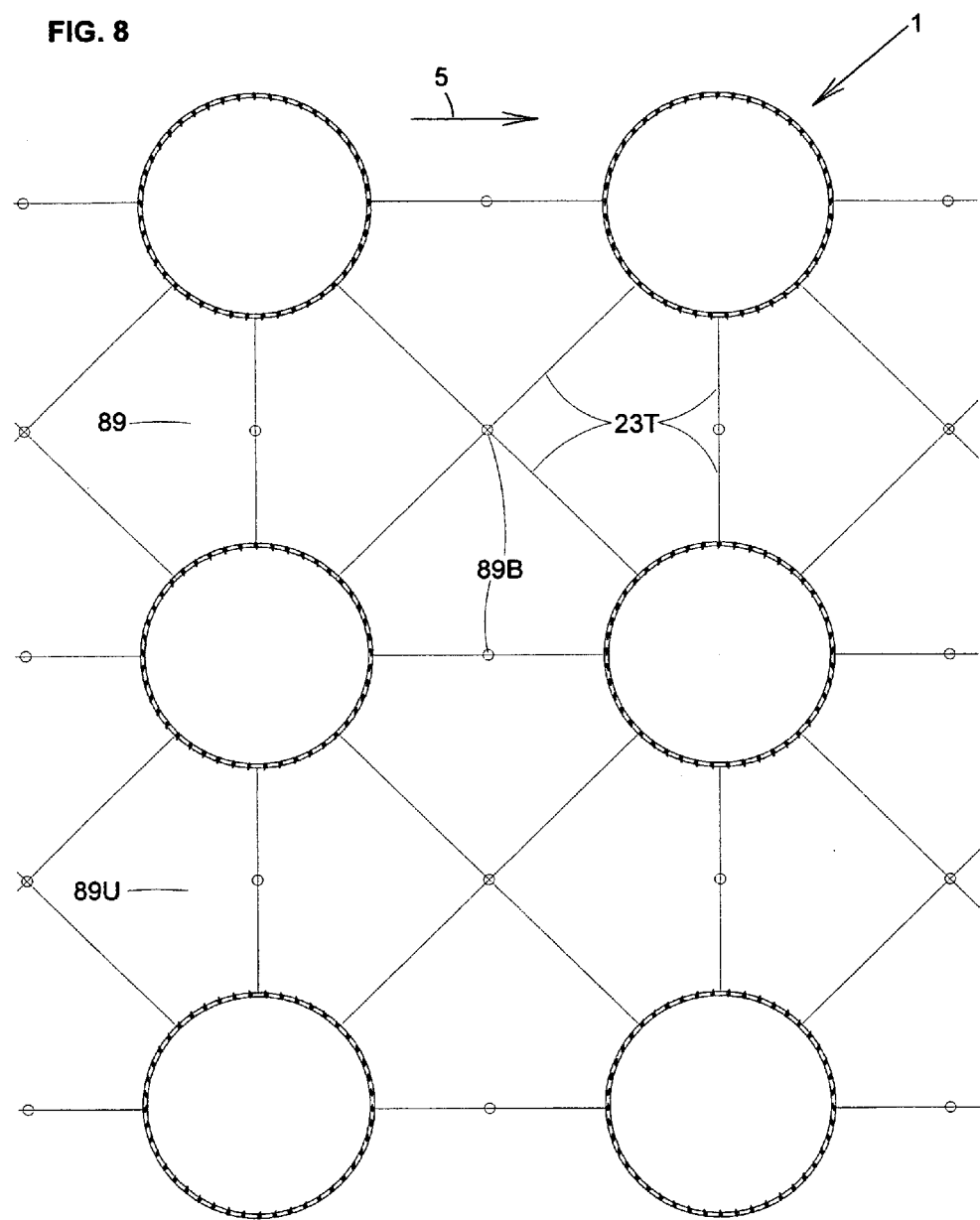

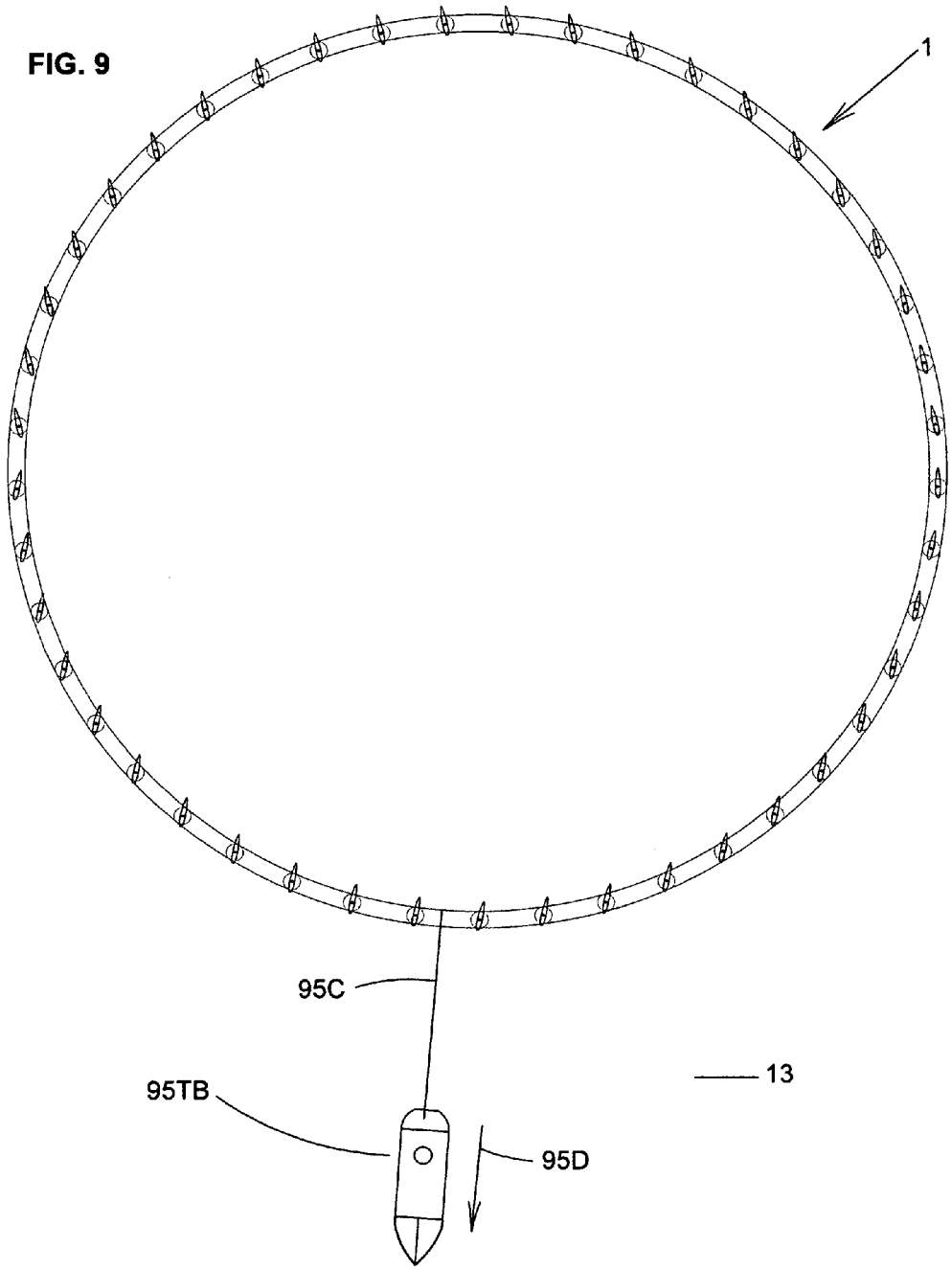

REVOLVING OVERHEAD WINDMILL

BACKGROUND OF THE INVENTION

As the World's human population grows and as the economic prosperity of our global population grows, the energy demand of our global population also grows. With limited availability of oil reserves, there is a growing need for the conception, development and deployment of cost-effective and large-scale renewable energy alternatives. The continued use of fossil fuels to meet current and emerging energy needs also has very negative environmental consequences, including massive emissions of carbon dioxide and other pollutants, along with exacerbation of global warming and climate change effects. These factors provide strong motivation for the invention, development and deployment of cost-effective, large-scale renewable energy alternatives.

The Sun provides enormous quantities of energy to the World every second, and that energy can be found in harvestable form as direct solar energy and as wind energy.

BRIEF SUMMARY OF THE INVENTION

The present invention provides a renewable energy harvesting system for harvesting fluid-dynamic renewable energy as contained in wind or air current energy.

The invention provides a revolving overhead windmill which includes airfoil means for interfacing with a fluid current such as a wind, and which includes energy harvesting means utilizing fluid current driven periodic motion of the airfoil means, for capturing fluid-dynamic renewable energy and converting it into usable energy in a desired form such as electricity. The invention provides devices, methods and systems for harvesting renewable energy for medium-scale, large-scale and ultra-large-scale applications, with a special focus on abundant offshore wind resources, to provide real and substantial benefits towards efficiently fulfilling energy needs while also more broadly serving humanity and our global environment. The various embodiments of the invention provide energy with zero consumption of fossil fuels and zero emissions of greenhouse gases.

The invention with its several preferred embodiments can be understood from a full consideration of the following specification including drawings, detailed description, and claims.

This invention constitutes a further advance of inventive technology related to a prior invention defined in U.S. Pat. No. 7,750,491 entitled "Fluid-Dynamic Renewable Energy Harvesting System" that was invented by the same Inventor and assigned to the same Assignee.

BRIEF DESCRIPTION OF THE DRAWINGS

FIG. 1A shows a plan view of a revolving overhead windmill, similar to a satellite view of the invention.

FIG. 6 shows an increased scale partial side view of another preferred embodiment of the invention, illustrating inventive features of the aerostatically supported upwind airfoil means and adjacent structure, sited over a layer of moving water such as a floodplain in a flood state, or tidelands with maximum high tides, or marshlands following heavy monsoon rains, or similar or analogous situations of a variable or a temporary layer of moving water.

FIG. 8 shows a plan view of multiple revolving overhead windmills in an array, with shared anchors in the underwater ground surface.

FIG. 9 shows a plan view of a revolving overhead windmill being towed to its installation site by a tugboat.

DETAILED DESCRIPTION

Figure 1B:
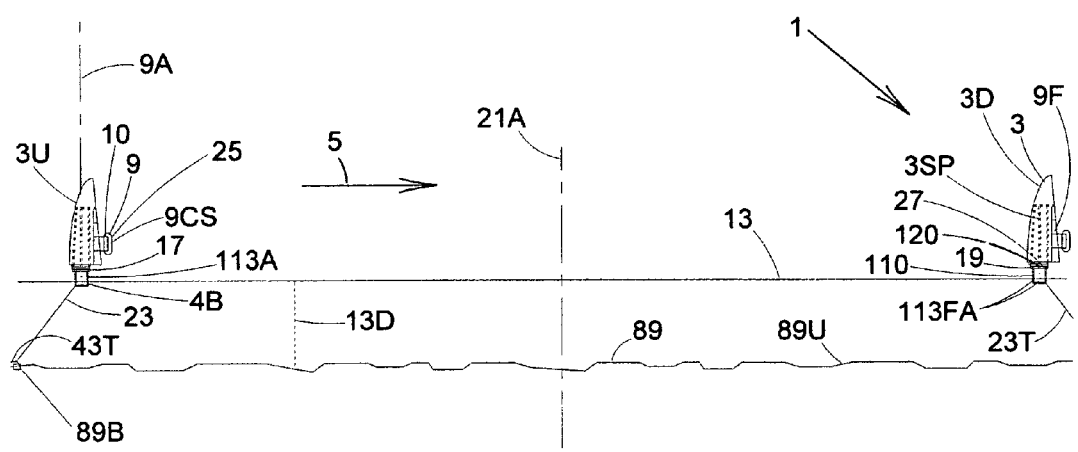
FIG. 1B shows a partial side view from a location far outside of the advancing airfoil means, of one preferred embodiment of the invention, showing only the upwind airfoil means and downwind airfoil means and adjacent structure.

Prior to commencing with the detailed description, certain expressions are defined as pertaining to their use in the following detailed description and claims.

The expression "topologically coaxial" as pertaining to two annular volumes refers to these two annular volumes having axes of revolution that are either (i) identical or (ii) separated some not excessive measure of linear or angular separation. To cite a common world example, a stack of onion rings of various sizes and geometries all ringing a common post would be considered "topologically coaxial" according to this definition.

The expression "overhead" as pertaining to the revolving overhead windmill, refers to a location that is up or at a level located somewhere in the opposite direction as the local gravity vector, from the perspective of a person or camera or viewpoint at the level of a local ground surface.

FIG. 1A shows a plan view of a revolving overhead windmill 1 above a ground surface 89, with the plan view being similar to a satellite view of the invention.

FIG. 1A shows a revolving overhead windmill 1 comprising plural airfoil means 3 for contacting proximate flow fields of an air current or wind current or wind 5, when said wind current exists and carries wind current energy in the form of fluid-dynamic kinetic energy. Each airfoil means 3 is installed with an effective axis of rotation 9A around which each of said airfoil means can effectively rotate in orientation to some extent, said axis of rotation being disposed within 60 degrees of vertical during normal operation of said revolving overhead windmill 1.

Connecting means 17 are provided, for serving as means for connecting the plural airfoil means 3 in a sequential arrangement around a circuit 21 of closed periphery topology enclosing an axis of revolution 21A, as illustrated, wherein the axis of revolution 21A is disposed within 60 degrees of vertical (vertical being out from the page in this plan view). The connecting means 17 include connecting members 19 that connect adjacently-located airfoil means 3 in the sequential arrangement.

While the configuration of the invention illustrated in FIG. 1A shows a total of 45 airfoil means arranged in a closed periphery topology, it should be understood that variant embodiments of the invention may feature different numbers of airfoil means and different geometric specifics and different size and different scale, without any express or implied limitation.

Note that the revolving overhead windmill 1 is revolving in a direction of revolution 1D that is a clockwise direction as seen in this plan view or satellite view, but that in variant embodiments it may revolve in a direction of revolution that is counterclockwise or clockwise as seen from a satellite view, or selectably clockwise or counterclockwise at different times as desired. Selection of clockwise or counterclockwise revolution for arrays of revolving overhead windmills in either the Northern Hemisphere or Southern Hemisphere, may also help reduce severity or risk of cyclonic storms in these Hemispheres, such as cyclones, hurricanes, typhoons and similar storm systems with air mass rotational energy content that can be destructive.

In the plan view shown in FIG. 1A, the air current or wind 5 is flowing from left to right, but it will be understood that the invention is operable for any and all steady or varying wind directions. With the wind 5 flowing from left to right in the illustration, the airfoil means 3 closest to the left end of the system is designated as the upwind airfoil means 3U. With the wind 5 flowing from left to right in the illustration, the airfoil means 3 closest to the right end of the system is designated as the downwind airfoil means 3D. With the clockwise direction of revolution 1D and the wind 5 flowing from left to right in the illustration, the airfoil means 3 closest to the top end of the system in this plan view, is designated as the retreating airfoil means 3D. With the clockwise direction of revolution 1D and the wind 5 flowing from left to right in the illustration, the airfoil means 3 closest to the bottom end of the system in this plan view, is designated as the advancing airfoil means 3A.

Thus FIG. 1A illustrates revolving overhead windmill 1, comprising: plural airfoil means 3 for contacting proximate flow fields of a wind current 5 when said wind current exists and carries wind current energy in the form of fluid-dynamic kinetic energy; an effective axis of rotation 9A around which each of said airfoil means can effectively rotate in orientation to some extent, said axis of rotation being disposed within 60 degrees of vertical during normal operation of said revolving overhead windmill; and connecting means 17 for connecting said plural airfoil means in sequence in an annular volume 101, said connecting means including connecting members 19 that connect adjacently-located airfoil means in said sequence.

FIG. 1B shows a partial side view from a location far outside of the advancing airfoil means 3A (shown in FIG. 1A), of one preferred embodiment of the revolving overhead windmill 1 of FIG. 1A, showing only the upwind airfoil means 3U and downwind airfoil means 3D and adjacent structure. Other parts of this preferred embodiment are hidden, so as to more clearly illustrate how key parts of the invention are related.

The airfoil means 3 are shown as wing-like windfoils with internal structure including wing spars 3SP, and also fitted with control surfaces 9CS that are used to appropriately orient each airfoil means 3 at an optimized angle of attack at various parts of its circuit around the axis of revolution 21A, to maximize wind energy extraction and harvest. In this preferred embodiment the illustrated energy harvesting means 25 includes control system means 9, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means 3 at said time-variable orientations to contribute to driving said substantially periodic motion when said wind current 5 exists and carries wind current energy in the form of fluid-dynamic kinetic energy. The control system means 9 includes the control surfaces 9CS. The illustrated airfoil means 3 are also shown fitted with trailing edge flaps 9F, to enable higher airfoil lift coefficients and further optimize wind energy harvest.

As shown, the energy harvesting means 25 further includes energy conversion means 27 for converting at least some of said net work into energy in a desired form for at least one of transmission, storage, processing and use, with said energy conversion means 27 including an annular electromagnetic generator 120. The annular electromagnetic generator could be a permanent magnet generator (PMG) or other generator.

In this preferred embodiment, buoyant support means 4B are provided, for utilizing a buoyancy force from fluid displacement comprising water displacement from a volume below a water surface 13, to at least partially contribute to supporting said airfoil means 3 above the water surface 13 and above a ground surface 89 wherein the ground surface is an underwater ground surface 89U. The water depth 13D can be any value from fractions of an inch to many miles, but without limitation may be on the order of 750 feet nominal for one version of the preferred embodiment as illustrated. Thus the revolving overhead windmill 1 here comprises an offshore vertical axis wind turbine with variable pitch airfoil means or windfoil means or blades, that revolve in a large circuit around the axis of revolution 21A. The revolving overhead windmill 1 is held substantially on station in a given geographic location, using position-keeping means 23 that include a position-keeping tether or cable 23T and anchor 89B in the underwater ground surface 89U. Note that a variety of known anchor devices including anchors, pilings, buried posts, ground screws penetrating into the underwater ground surface 89U, etc., that are known from the prior art, can be used within the spirit and scope of the invention herein described.

FIG. 1B also illustrates vertical load reacting means 110 for reacting vertical loads, said vertical loads comprising at least one of airfoil means weight loads and buoyant support means buoyancy loads. The vertical load reacting means 110 here include an annular truss 113A comprising a floating annular truss 113FA that serves as at least part of the buoyant support means 4B. The distributed buoyancy support provided around a large circumference by the floating annular truss 113FA enables adequate support while reducing wave-induced loads and structural failure risk of the revolving overhead windmill 1, even for large amplitude and/or large wavelength waves such as tsunami waves in open seas or coastal regions.

Figure 1C:
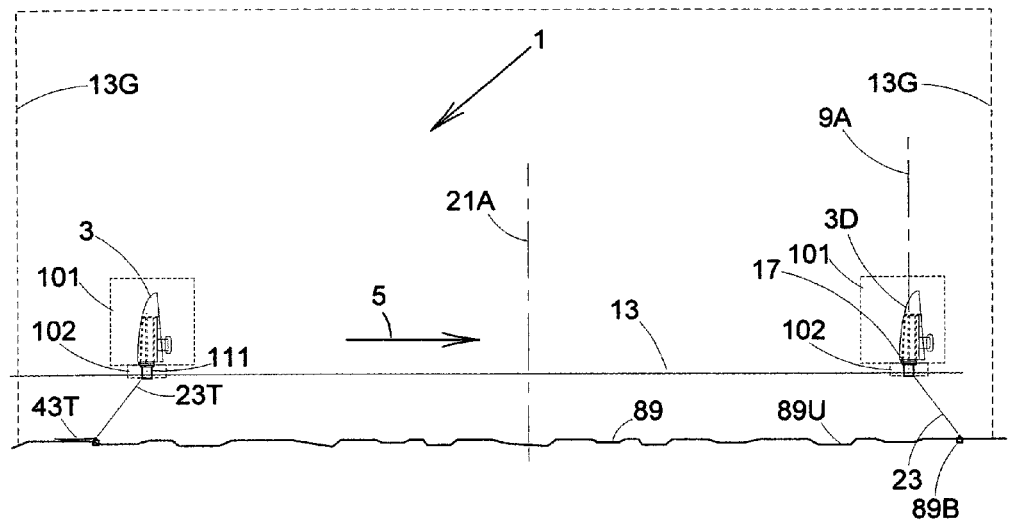
FIG. 1C shows a partial side view of the same embodiment as FIG. 1B, more clearly illustrating an annular volume and second annular volume.

FIG. 1C shows a partial side view of the same embodiment as FIG. 1B, more clearly illustrating an annular volume 101 and second annular volume 102. Connecting means 17 serve as means for connecting said plural airfoil means 3 in sequence in the illustrated annular volume 101.

FIG. 1C also illustrates vertical load reacting means comprising plural vertical-load-carrying structural members 111 arranged in sequence in a second annular volume 102 that is topologically coaxial with said annular volume 101.

FIG. 1C further illustrates position-keeping means 23 for maintaining said revolving overhead windmill 1 substantially within a desired geographic envelope 13G, which position-keeping means includes at least one of a tether or cable 23T and an anchor 89B fastened to the underwater ground surface 89U.

Figure 1D:
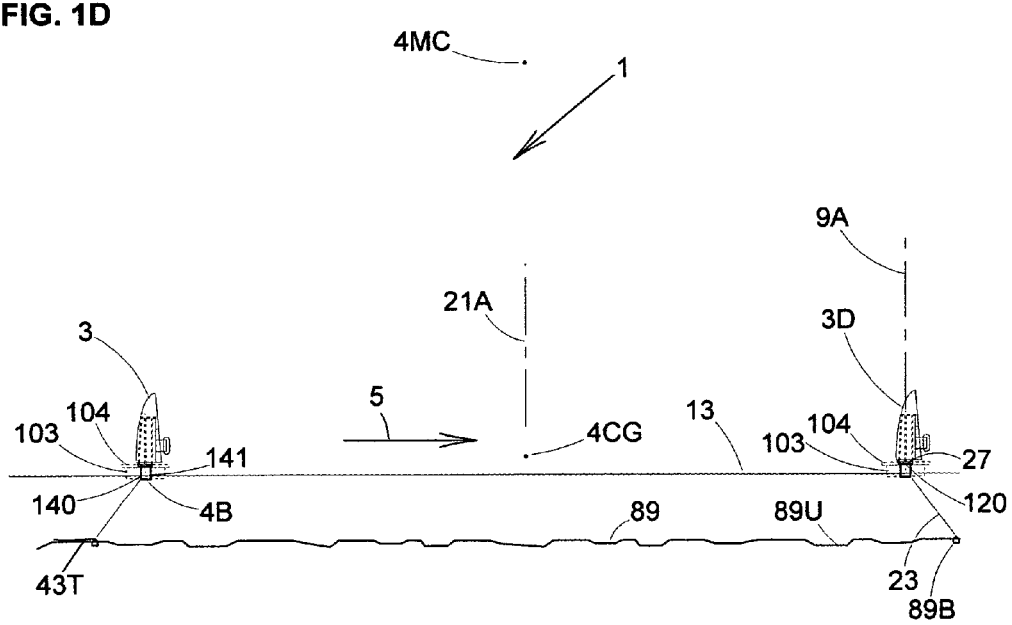
FIG. 1D shows a partial side view of the same embodiment as FIG. 1B, more clearly illustrating a third annular volume and fourth annular volume as well as location of a center of gravity below a metacenter.

FIG. 1D shows a partial side view of the same embodiment as FIG. 1B, more clearly illustrating a third annular volume 103 and fourth annular volume 104 as well as location of a center of gravity 4CG below a metacenter 4MC.

FIG. 1D shows wave load reduction means 140 comprising plural load reduction elements 141 arranged in sequence in a third annular volume 103 that is topologically coaxial with the annular volume 101 of FIG. 1C.

FIG. 1D also shows energy harvesting means including energy conversion means 27 for converting at least some of said net work into energy in a desired form for at least one of transmission, storage, processing and use; said energy conversion means 27 including an annular electromagnetic generator 120 located in a fourth annular volume 104 that is topologically coaxial with the annular volume 101 of FIG. 1C.

FIG. 1D further shows a revolving overhead windmill 1, wherein a portion of said revolving overhead windmill 1 that is supported by the buoyancy force from buoyant support means 4B, has a center of gravity location 4CG that is below a metacenter 4MC associated with said buoyancy force.

It is well known in the art of floating entities that floating entities have a metacenter associated with the entity's center of buoyancy and its movement, and that a floating entity will typically float stably when it has a center of gravity location that is below this metacenter. Sometimes there are multiple metacenters associated with different axes of rotation of a floating entity, and in this case it will float stably when it has a center of gravity location below the lowest of the plural metacenters associated with different possible axes of rotation. For cases with water and/or air displacement buoyancy, the concept of stability associated with center of gravity location below one or more equivalent metacenters can be similarly defined by extension.

Figure 1E:
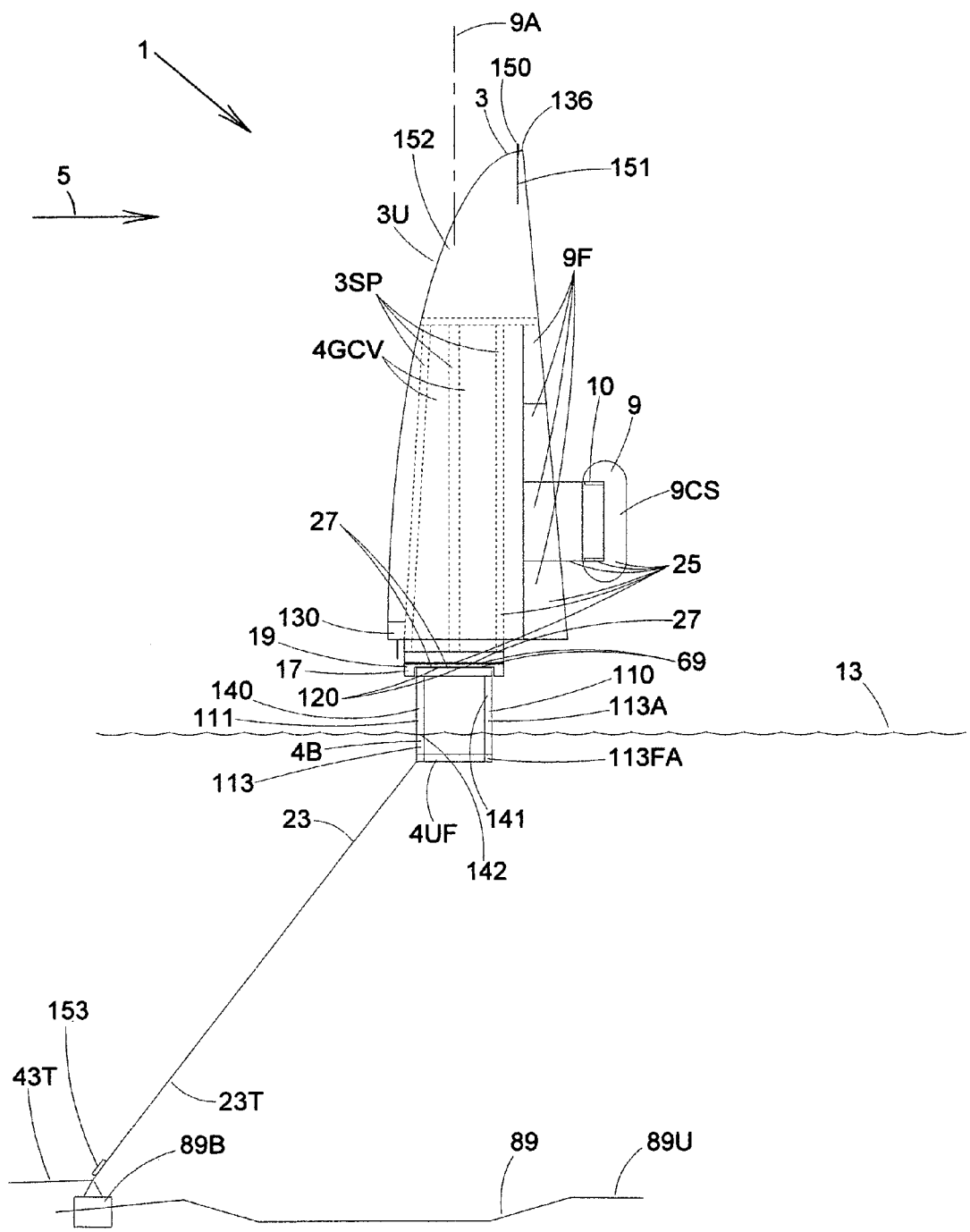
FIG. 1E shows an increased scale partial side view of the embodiment of FIG. 1B, to more clearly illustrate inventive features of the upwind airfoil means and adjacent structure.

FIG. 1E shows an increased scale partial side view of the embodiment of FIG. 1B, to more clearly illustrate inventive features of the upwind airfoil means and adjacent structure.

A light 136 is shown on top of the airfoil means, and could be an aviation warning strobe or wind turbine warning light, to cite a couple of examples without any implied limitation.

The airfoil means 3 is shown with three spars, comprising a main spar or central spar, forward spar and rear spar. While a three spar design is shown, it should be understood that designs with a single spar, with two spars, or with multiple spars are also possible within the spirit and scope of the invention, and based on analogous precedents in aircraft wing design and wind turbine blade design, without limitation. The space between spars is shown as gaseous content volume 4GCV, which may be sealed or vented to the external atmosphere in alternate preferred embodiments. For reference, this space between spars is commonly used for fuel carriage in aircraft wings. The gaseous content volume 4CGV is preferably filled with air, but in an alternate variant embodiment could be filled with a lifting gas such as hot air, hydrogen gas, or helium gas.

The illustrated airfoil means 3 is shown fitted with four trailing edge flaps 9F, without limitation. Various types of flaps such as simple hinged flaps, split flaps, slotted flaps, multi-slotted flaps, fowler flaps, blown flaps, or variable camber trailing edge integrated flaps, can be used within the spirit and scope of the invention. The preferred airfoil means have a well-designed symmetrical airfoil section, and the trailing edge flaps enable higher lift coefficients to be obtained, without excessive drag penalties. Leading edge high-lift devices (not shown) as known from the prior art of airfoils and wings, can also optionally be fitted to the airfoil means 3 in alternate embodiments of the invention.

The illustrated control system means 9 include actuator means 10, and serve as means for controlling time-variable orientations of said airfoil means 3 relative to said proximate flow fields of said wind current 5 when said wind current exists and carries wind current energy in the form of fluid-dynamic kinetic energy. The actuator means 10 may comprise one or more of electrical actuation and electro-mechanical actuation and electro-hydraulic actuation and hydraulic actuation and pneumatic actuation and magnetic actuation and piezoelectric actuation and thermal actuation and shape memory alloy actuation, in variant embodiments of the invention as described and claimed.

In the illustrated embodiment the actuator means 10 acts on a control surface 9CS, that can be commanded to deflect to a desired angle so as to exert a desired control moment (in yaw) on one or both of the airfoil means 3 and the trailing edge flaps 9F, so as to set the airfoil means at a desired angle of attack relative to the incoming airstream (accounting for the wind as well as the revolution speed of the revolving overhead windmill 1) and so as to set the flaps at an optimal deflection to optimize wind power extraction. Note that the control surface support structure may be mated to either the airfoil means 3 or flaps 9F or both through mechanical means for coupling aerodynamic surfaces, known in the prior art of airfoil and wing and control surface and control system design. The mechanical means may include one or more of mechanical linkage means, spring means, damper means, gearing means, nonlinear linkage means, and travel stop means, as are known and applied in related fields of art. Note also that a control surface may have mass balance such as for avoiding aeroelastic effects such as flutter or divergence, may have aerodynamic balance, may have a horn balance (as illustrated) for reducing actuator power, may have proportional control, may have nonlinear control, and may have bang-bang control. Control laws or control algorithms for actuator control may include elements such as aerodynamic wake compensation control law that optimizes at least one of circumferential thrust, torque or power harvest while effectively compensating for downstream airfoils traversing the aerodynamic wake of upstream airfoils. Further description of control system features will be presented subsequently, in the context of FIGS. 10A through 10D.

FIG. 1E shows energy harvesting means 25 that include the control system means 9, actuator means 10, control surface 9CS, support structure connecting the airfoil means 3 to the control surface 9CS, trailing edge flaps 9F, the airfoil means 3 including spars 3SP, and energy conversion means 27 including an annular electromagnetic generator 120.

FIG. 1E also shows vertical load reacting means 110 for reacting vertical loads, said vertical loads comprising at least one of airfoil means weight loads and buoyant support means buoyancy loads, said vertical load reacting means comprising plural vertical-load-carrying structural members 111.

FIG. 1E also illustrates buoyant support means 4B for utilizing a buoyancy force from fluid displacement comprising water displacement from a volume below a water surface 13, to at least partially contribute to supporting said airfoil means 3 above the water surface 13 and above a ground surface 89 wherein the ground surface is an underwater ground surface 89U; connecting means 17 for connecting said plural airfoil means, said connecting means 17 including connecting members 19 that connect adjacently-located airfoil means 3 in sequence; and wave load reduction means 140 for reducing peak wave-induced loads acting on said connecting means 17 relative to reference peak wave-induced loads that would occur if said connecting means were rigidly attached to and supported by a rigid half-submerged toroidal ring floating in the water directly beneath said connecting means 17, said wave load reduction means comprising plural load reduction elements 141.

FIG. 1E further illustrates means for transmitting energy 43T, such as electrical wire, to carry energy from the energy conversion means 27 including the annular electromagnetic generator 120. The harvested electrical energy is consequential to the time integral of electrical power generated by said annular electromagnetic generator 120, driven by captured wind power flowing as mechanical power in the circumferentially aligned force components from said airfoil means 3, acting on said circumferential connecting means 17 and multiplied by the circumferential or azimuthal velocity of said connecting means 17.

FIG. 1E also illustrates a revolving overhead windmill 1, further comprising protection means 150 for reducing risk of damage to said revolving overhead windmill 1 from an environmental threat, wherein said environmental threat comprises at least one of a lightning strike (e.g., using the illustrated lightning rod) and an electromagnetic energy threat and a hurricane and a typhoon and a cyclone and a storm and a tsunami and a seismic sea wave and a tidal wave and a tidal bore and a large sea wave and an earthquake and volcanic activity and hail and a rainstorm and a snowstorm; and wherein said protection means comprises at least one of a grounding wire 151, an electromagnetic threat shielding layer 152, and tether load reduction means 153 for reducing loads consequent to said environmental threat acting on said revolving overhead windmill 1 from at least one tether connecting said revolving overhead windmill Ito said underwater ground surface 89U.

FIG. 1E also illustrates an electrical device 130 supported by structure in said airfoil means 3, as will be described further in the context of FIG. 1F, below.

Figure 1F:
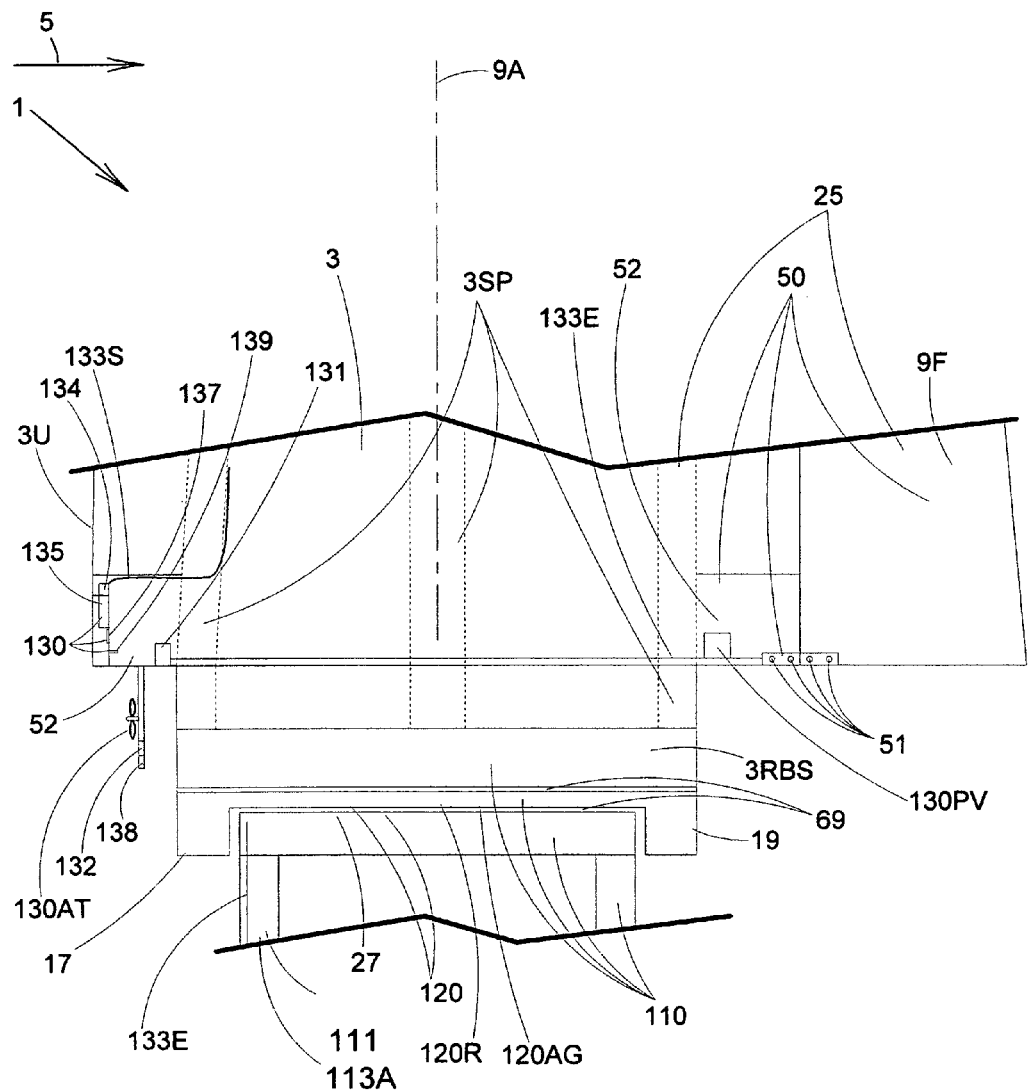
FIG. 1F shows a further increased scale partial side view of the embodiment of FIG. 1B, to more clearly illustrate inventive features near the base of the upwind airfoil means.

FIG. 1F shows a further increased scale partial side view of the embodiment of FIG. 1B, to more clearly illustrate inventive features near the base of the upwind airfoil means.

FIG. 1F shows an electrical device 130 supported by structure in said airfoil means 3, which electrical device 130 comprises at least one of a battery 131 (shown) and a sensor 132 (shown) and an electrical wire 133E (shown) and a signal wire 133S (shown, may be electrical or optical or other type of signal wire, without limitation) and an electro-optical component 134 (shown) and a computer 135 (shown) and a light 136 (shown in FIG. 1E preceding) and a display 137 (shown) and a communication device 138 (shown) and a human interface device 139 (shown) and a photovoltaic electrical power source device 130PV and an air turbine electrical power source device 130AT.

FIG. 1F also shows the revolving overhead windmill 1 including plural modular structural members 50 and further including fastener means 51 for detachably connecting adjacent modular structural members to enable at least one of assembly and maintenance and inspection and service and repair and replacement, and further including an access space 52 for at least one of a human and a robot and a tool and a camera to be in said access space to at least one of facilitate and perform said at least one of assembly and maintenance and inspection and service and repair and replacement.

Variant embodiments of the invention may include access spaces 52 suitable for human access that include without limitation an access hole, a catwalk, a gangway, a ladder, a stairway, an elevator, an escalator, a control room, an instrumentation/diagnosis room, an observation room or deck, an apartment room, a restroom, a dining area, a medical area, a helipad and a shelter area. Access means for accessing parts of the revolving overhead windmill 1 for inspection, maintenance, cleaning, service, repair and other purposes, may include human access means, robot access means, humanoid robot access means, and camera or imaging access means.

For embodiments where the airfoil means 3 includes one or more of laminar flow surfaces or hybrid laminar flow surfaces or riblet surfaces or surfaces with vortex generators to inhibit airflow separation, access and/or cleaning and/or maintenance and/or service and/or replacement means may be provided.

FIG. 1F further illustrates airfoil rotating base structure 3RBS at the base of the airfoil means 3, with the three spars 3SP structurally connected thereto. The rotating base structure 3RBS, in normal operation, can freely rotate around the effective axis of rotation 9A on a bearing interface 69, above the annular connecting means 17. Bearing means 69 also enable the connecting means 17 and annular electromagnetic generator rotor 120R, part of the energy conversion means 27, to together revolve above the air gap between rotor and stator 120AG, over the stator part of the annular electromagnetic generator 120. Note that annular connecting means 17, bearing means 69, and annular electromagnetic generator 120 can all include multiple components arranged in the annular geometry around the closed periphery topology enclosing the axis of revolution 21A shown in FIG. 1A.

Figure 1G:
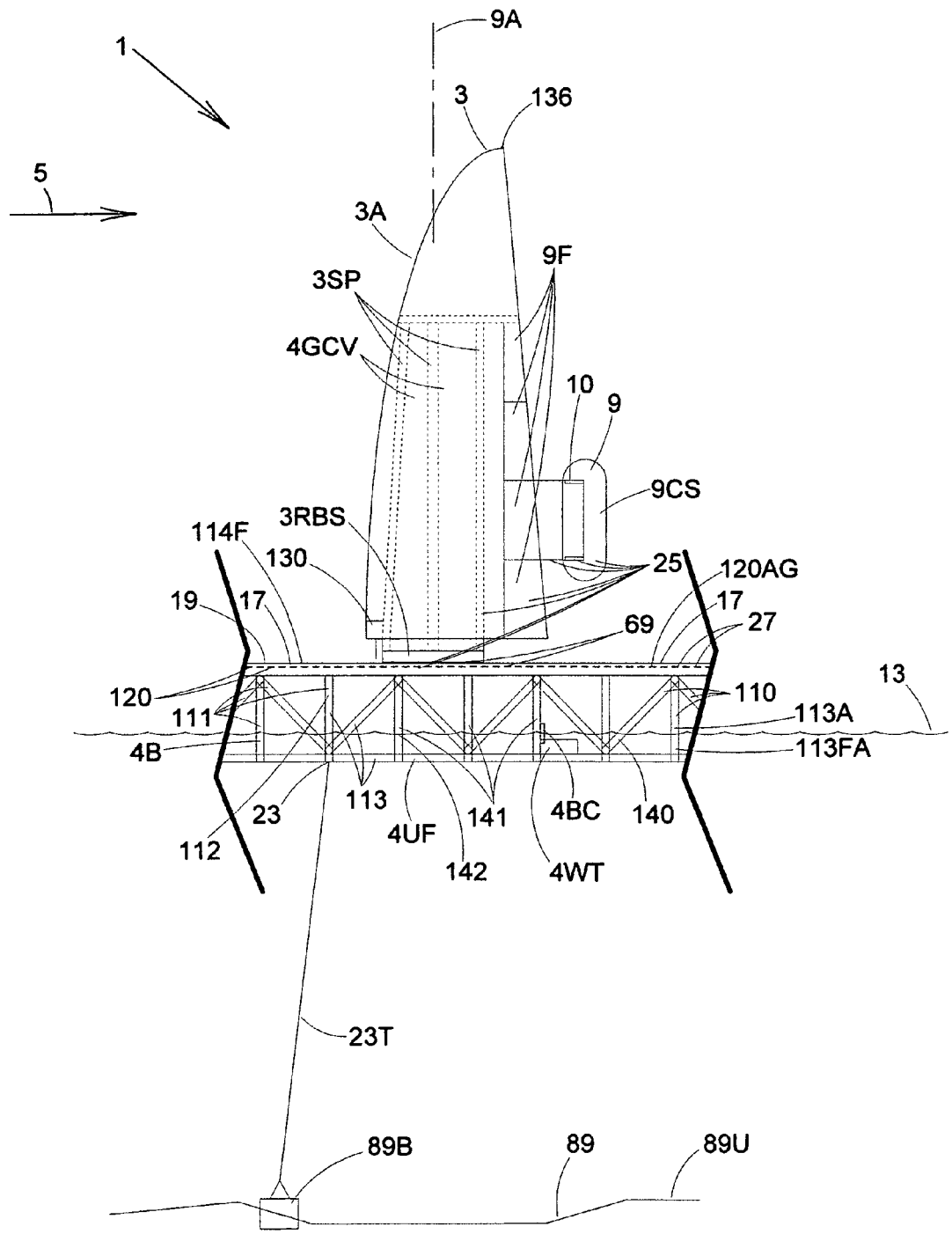
FIG. 1G shows an increased scale partial side view of the embodiment of FIG. 1B from a location outside of the advancing airfoil means, of the advancing airfoil means and adjacent structure.

FIG. 1G shows an increased scale partial side view of the embodiment of FIG. 1B from a location outside of the advancing airfoil means, of the advancing airfoil means and adjacent structure.

FIG. 1G shows many of the same inventive features as FIG. 1E, but now illustrating more features of the annular truss 113 that comprises a floating annular truss 113FA.

FIG. 1G also shows vertical load reacting means 110 for reacting vertical loads, said vertical loads comprising at least one of airfoil means weight loads and buoyant support means buoyancy loads, said vertical load reacting means comprising plural vertical-load-carrying structural members 111 arranged in sequence. FIG. 1G illustrates vertical-load-carrying structural members 111 including (i) a post 112 and (ii) a truss 113 and (iii) an annular truss 113A and (iv) a floating annular truss 113FA. The post 112 could comprise a rod, bar, beam, spar, mast or other similar structural member.

FIG. 1G also illustrates buoyant support means 4B along with buoyancy control means 4BC that serves as means for varying the buoyancy force by pumping water ballast between a water tank 4WT and the body of water below said water surface 13.

FIG. 1G also illustrates wave load reduction means 140 for reducing peak wave-induced loads acting on said connecting means 17 relative to reference peak wave-induced loads that would occur if said connecting means were rigidly attached to and supported by a rigid half-submerged toroidal ring floating in the water directly beneath said connecting means 17, said wave load reduction means comprising plural load reduction elements 141 arranged in sequence.

The illustrated wave load reduction means 140 comprise water surface penetrating members 142 with a total cross-sectional area on the plane of said water surface 13 when there are no waves, that is less than a corresponding total cross-sectional area that would occur for said rigid half-submerged toroidal ring on the plane of said water surface 13 when there are no waves. This reduces the incremental wave induced load for a given local water surface level change, as the incremental water displacement volume is smaller and thus the incremental water displacement load will be smaller.

Note that the wave load reduction means 140 may act to reduce one or more of many different kinds of wave induced loads from many different kinds of waves with different amplitudes, wavelengths, waveforms, speeds and three-dimensional and time-varying aspects. Waves can range from modest wind-driven waves to very large wavelength and/or amplitude waves such as tsunamis, tidal waves, earthquake caused waves etc. in open water and in shallowing or coastal waters. Wave loads may also combine with water current loads such as from an ocean current, tidal current or river current, and in conjunction may cause heaving, rolling, compression, tension, bending, twisting and/or torsion loads on structural members in the revolving overhead windmill 1.

While not illustrated, the embodiment illustrated in FIG. 1G can include features for preventing or inhibiting loss of cleanliness or damage to surfaces from biological entities such as birds, marine life forms and animals. Other examples include algae, barnacles, crustaceans, sucker-equipped fish, etc. Examples of inhibiting or prevention means know from related prior art include bird inhibiting means such as bird perch prevention strips, visual or aural or olfactory inhibiting means, biofouling inhibiting means such as special coatings or surface treatments, etc.

The preferred embodiment of FIG. 1B through 1G, in conjunction with the plan view configuration of the invention as shown in FIG. 1A, therefore illustrates:

a revolving overhead windmill 1, comprising:
plural airfoil means 3 for contacting proximate flow fields of a wind current 5 when said wind current exists and carries wind current energy in the form of fluid-dynamic kinetic energy;
an effective axis of rotation 9A around which each of said airfoil means can effectively rotate in orientation to some extent, said axis of rotation being disposed within 60 degrees of vertical during normal operation of said revolving overhead windmill;
control system means 9 including actuator means 10, for controlling time-variable orientations of said airfoil means relative to said proximate flow fields of said wind current when said wind current exists and carries wind current energy in the form of fluid-dynamic kinetic energy;
buoyant support means 4B for utilizing a buoyancy force from fluid displacement to at least partially contribute to supporting said airfoil means 3 above a ground surface 89;
connecting means 17 for connecting said plural airfoil means in sequence in an annular volume 101, said connecting means including connecting members 19 that connect adjacently-located airfoil means in said sequence;
vertical load reacting means 110 for reacting vertical loads, said vertical loads comprising at least one of airfoil means weight loads and buoyant support means buoyancy loads, said vertical load reacting means comprising plural vertical-load-carrying structural members 111 arranged in sequence in a second annular volume 102 that is topologically coaxial with said annular volume;
and
energy harvesting means 25 including said control system means 9, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means 3 at said time-variable orientations to contribute to driving said substantially periodic motion when said wind current 5 exists and carries wind current energy in the form of fluid-dynamic kinetic energy;
said energy harvesting means further including energy conversion means 27 for converting at least some of said net work into energy in a desired form for at least one of transmission, storage, processing and use; wherein said energy harvesting means 25 utilizes relative motion between (i) revolving structure connected to said airfoil means 3 revolving in said annular volume 101 and driving said substantially periodic motion when said wind current exists and carries wind current energy in the form of fluid-dynamic kinetic energy, and (ii) nonrevolving connected structure including said vertical-load-carrying structural members 111 arranged in sequence in said second annular volume 102, said vertical-load-carrying structural members 111 comprising elongated structural members making plural separated penetrations through a water surface 13, with portions of said elongated structural members below said water surface 13 displacing water to generate said buoyancy loads and to thereby serve as plural separated float members, said buoyancy loads associated with said plural separated float members further providing at least contributory support to support said energy conversion means 27 above said water surface 13.

The preferred embodiment of FIG. 1B through 1G, in conjunction with the plan view configuration of the invention as shown in FIG. 1A, also illustrates:

a revolving overhead windmill 1, comprising:
plural airfoil means 3 for contacting proximate flow fields of a wind current 5 when said wind current exists and carries wind current energy in the form of fluid-dynamic kinetic energy;
an effective axis of rotation 9A around which each of said airfoil means can effectively rotate in orientation to some extent, said axis of rotation being disposed within 60 degrees of vertical during normal operation of said revolving overhead windmill;

control system means 9 including actuator means 10, for controlling time-variable orientations of said airfoil means relative to said proximate flow fields of said wind current when said wind current exists and carries wind current energy in the form of fluid-dynamic kinetic energy;

buoyant support means 4B for utilizing a buoyancy force from fluid displacement comprising water displacement from a volume below a water surface 13, to at least partially contribute to supporting said airfoil means 3 above the water surface 13 and above a ground surface 89 wherein the ground surface is an underwater ground surface 89U;

connecting means 17 for connecting said plural airfoil means in sequence in an annular volume 101, said connecting means including connecting members 19 that connect adjacently-located airfoil means in said sequence;

wave load reduction means 140 for reducing peak wave-induced loads acting on said connecting means 17 relative to reference peak wave-induced loads that would occur if said connecting means were rigidly attached to and supported by a rigid half-submerged toroidal ring floating in the water directly beneath said connecting means 17, said wave load reduction means comprising plural load reduction elements 141 arranged in sequence in a third annular volume 103 that is topologically coaxial with said annular volume and energy harvesting means 25 including said control system means 9, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means 3 at said time-variable orientations to contribute to driving said substantially periodic motion when said wind current 5 exists and carries wind current energy in the form of fluid-dynamic kinetic energy;

said energy harvesting means further including energy conversion means 27 for converting at least some of said net work into energy in a desired form for at least one of transmission, storage, processing and use; wherein said energy harvesting means 25 utilizes relative motion between (i) said connecting means 17 for connecting said plural airfoil means 3, serving as revolving structure connected to said airfoil means 3, revolving in said annular volume 101 and driving said substantially periodic motion when said wind current exists and carries wind current energy in the form of fluid-dynamic kinetic energy, and (ii) nonrevolving connected structure including said plural load reduction elements 141 arranged in sequence in said third annular volume 103, said load reduction elements 141 comprising elongated structural members making plural separated penetrations through said water surface 13, with portions of said elongated structural members below said water surface 13 displacing water to serve as plural separated float members, with said plural separated float members together serving as said buoyant support means 4B.

The preferred embodiment of FIG. 1B through 1G, in conjunction with the plan view configuration of the invention as shown in FIG. 1A, also illustrates:

a revolving overhead windmill 1, comprising:

plural airfoil means 3 for contacting proximate flow fields of a wind current 5 when said wind current exists and carries wind current energy in the form of fluid-dynamic kinetic energy;

an effective axis of rotation 9A around which each of said airfoil means can effectively rotate in orientation to some extent, said axis of rotation being disposed within 60 degrees of vertical during normal operation of said revolving overhead windmill;

control system means 9 including actuator means 10, for controlling time-variable orientations of said airfoil means relative to said proximate flow fields of said wind current when said wind current exists and carries wind current energy in the form of fluid-dynamic kinetic energy;

buoyant support means 4B for utilizing a buoyancy force from fluid displacement to at least partially contribute to supporting said airfoil means 3 above a ground surface 89;

connecting means 17 for connecting said plural airfoil means in sequence in an annular volume 101, said connecting means including connecting members 19 that connect adjacently-located airfoil means in said sequence;

and energy harvesting means 25 including said control system means 9, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means 3 at said time-variable orientations to contribute to driving said substantially periodic motion when said wind current 5 exists and carries wind current energy in the form of fluid-dynamic kinetic energy;

said energy harvesting means further including energy conversion means 27 for converting at least some of said net work into energy in a desired form for at least one of transmission, storage, processing and use;

said energy conversion means 27 including an annular electromagnetic generator 120 located in a fourth annular volume 104 that is topologically coaxial with said annular volume.

The preferred embodiment of FIG. 1B through 1G, in conjunction with the plan view configuration of the invention as shown in FIG. 1A, also illustrates:

revolving overhead windmill 1, wherein said control system means 9 utilizes actuator means 10 that acts on at least one of (i) said airfoil means 3 and (ii) a control surface 9CS connected to at least one of said airfoil means 3 and a trailing edge flap 9F, which trailing edge flap is connected to said airfoil means and (iii) a control tab 9CT;

and wherein said actuator means 10 utilizes at least one of electrical actuation and electro-mechanical actuation and electro-hydraulic actuation and hydraulic actuation and pneumatic actuation and magnetic actuation and piezoelectric actuation and thermal actuation and shape memory alloy actuation.

The preferred embodiment of FIG. 1B through 1G, in conjunction with the plan view configuration of the invention as shown in FIG. 1A, also illustrates:

a revolving overhead windmill 1, wherein said buoyant support means 4B utilizes at least one of (i) a buoyancy force from fluid displacement comprising displacement of water utilizing an underwater float member 4UF, and (ii) a buoyancy force from fluid displacement comprising displacement of air utilizing a lifting gas chamber 4LG.

The preferred embodiment of FIG. 1B through 1G, in conjunction with the plan view configuration of the invention as shown in FIG. 1A, also illustrates:
a revolving overhead windmill 1,
wherein said vertical-load-carrying structural members 111 include at least one of (i) a post 112 and (ii) a truss 113 and (iii) an annular truss 113A and (iv) a floating annular truss 113FA and (v) a pivoting structural member 114 and (vi) a cable 115 and (vii) a stretchable cord 116 and (viii) a damper 117 and (ix) a shock absorber 118.

The preferred embodiment of FIG. 1B through 1G, in conjunction with the plan view configuration of the invention as shown in FIG. 1A, also illustrates:
a revolving overhead windmill 1,
wherein said energy conversion means 27 for converting at least some of said net work into energy in a desired form for at least one of transmission, storage, processing and use, comprises an annular electromagnetic generator 120 located in a fourth annular volume 104 that is topologically coaxial with said annular volume, which annular electromagnetic generator is configured to convert said net work into electrical energy.

The preferred embodiment of FIG. 1B through 1G, in conjunction with the plan view configuration of the invention as shown in FIG. 1A, also illustrates:
a revolving overhead windmill 1,
further comprising an electrical device 130 supported by structure in said airfoil means 3, which electrical device 130 comprises at least one of a battery 131 and a sensor 132 and an electrical wire 133E and a signal wire 133S and a an electro-optical component 134 and a computer 135 and a light 136 and a display 137 and a communication device 138 and a human interface device 139 and a photovoltaic electrical power source device 130PV and an air turbine electrical power source device 130AT.

The preferred embodiment of FIG. 1B through 1G, in conjunction with the plan view configuration of the invention as shown in FIG. 1A, also illustrates:
a revolving overhead windmill 1,
wherein said revolving overhead windmill 1 includes plural modular structural members 50 and further includes fastener means 51 for detachably connecting adjacent modular structural members to enable at least one of assembly and maintenance and inspection and service and repair and replacement, and further includes an access space 52 for at least one of a human and a robot and a tool and a camera to be in said access space to at least one of facilitate and perform said at least one of assembly and maintenance and inspection and service and repair and replacement.

The preferred embodiment of FIG. 1B through 1G, in conjunction with the plan view configuration of the invention as shown in FIG. 1A, also illustrates:
a revolving overhead windmill 1,
wherein said wave load reduction means 140 are contained in vertical load reacting means 110 for reacting vertical loads, said vertical loads comprising at least one of airfoil means weight loads and buoyant support means buoyancy loads, said vertical load reacting means comprising plural vertical-load-carrying structural members 111 arranged in sequence in a second annular volume 102 that is topologically coaxial with said annular volume 101.

The preferred embodiment of FIG. 1B through 1G, in conjunction with the plan view configuration of the invention as shown in FIG. 1A, also illustrates:
a revolving overhead windmill 1,
wherein said load reduction elements 141 include at least one of (i) a damper 117 and (ii) a shock absorber 118 and (iii) a pivoting structural member 114P and (iv) a flexible structural member 114F and (v) a stretchable cord 116 and (vi) a cable 115.

The preferred embodiment of FIG. 1B through 1G, in conjunction with the plan view configuration of the invention as shown in FIG. 1A, also illustrates:
a revolving overhead windmill 1,
wherein said wave load reduction means 140 comprises water surface penetrating members 142 with a total cross-sectional area on the plane of said water surface 13 when there are no waves, that is less than a corresponding total cross-sectional area that would occur for said rigid half-submerged toroidal ring on the plane of said water surface 13 when there are no waves.

The preferred embodiment of FIG. 1B through 1G, in conjunction with the plan view configuration of the invention as shown in FIG. 1A, also illustrates:
a revolving overhead windmill 1,
wherein said water surface penetrating members 142 collectively include at least one of (i) a post 112 and (ii) a truss 113 and (iii) an annular truss 113A and (iv) a floating annular truss 113FA.

The preferred embodiment of FIG. 1B through 1G, in conjunction with the plan view configuration of the invention as shown in FIG. 1A, also illustrates:
a revolving overhead windmill 1,
wherein said buoyant support means 4B includes utilizes a buoyancy force from fluid displacement comprising displacement of water utilizing an underwater float member 4UF, and further comprising buoyancy control means 4BC for varying said buoyancy force by pumping water ballast between a water tank 4WT and the body of water below said water surface 13.

The preferred embodiment of FIG. 1B through 1G, in conjunction with the plan view configuration of the invention as shown in FIG. 1A, also illustrates:
revolving overhead windmill 1,
further comprising protection means 150 for reducing risk of damage to said revolving overhead windmill 1 from an environmental threat, wherein said environmental threat comprises at least one of a lightning strike and an electromagnetic energy threat and a hurricane and a typhoon and a cyclone and a storm and a tsunami and a seismic sea wave and a tidal wave and a tidal bore and a large sea wave and an earthquake and volcanic activity and hail and a rainstorm and a snowstorm; and wherein said protection means comprises at least one of a grounding wire 151, an electromagnetic threat shielding layer 152, means for limiting revolutions per minute of said plural airfoil means 3 over said cycle of substantially periodic motion, means for commanding said plural airfoil means 3 to a feathered condition, motion limiting means for protecting bearing members that normally enable said cycle of substantially periodic motion, means for elevating said plural airfoil means to an increased elevation above said water surface 13, and tether load reduction means 153 for reducing loads consequent to said environmental threat acting on said revolving overhead windmill 1 from at least one tether connecting said revolving overhead windmill 1 to said underwater ground surface 89U.

The preferred embodiment of FIG. 1B through 1G, in conjunction with the plan view configuration of the invention as shown in FIG. 1A, also illustrates:

a revolving overhead windmill 1, further comprising position-keeping means 23 for maintaining said revolving overhead windmill 1 substantially within a desired geographic envelope 13G, which position-keeping means includes at least one of a tether or cable 23T and an anchor 89B fastened to the underwater ground surface 89U.

The preferred embodiment of FIG. 1B through 1G, in conjunction with the plan view configuration of the invention as shown in FIG. 1A, also illustrates:

a revolving overhead windmill 1, wherein a portion of said revolving overhead windmill 1 that is supported by said buoyancy force, has a center of gravity location 4CG that is below a metacenter 4MC associated with said buoyancy force.

Figure 2:
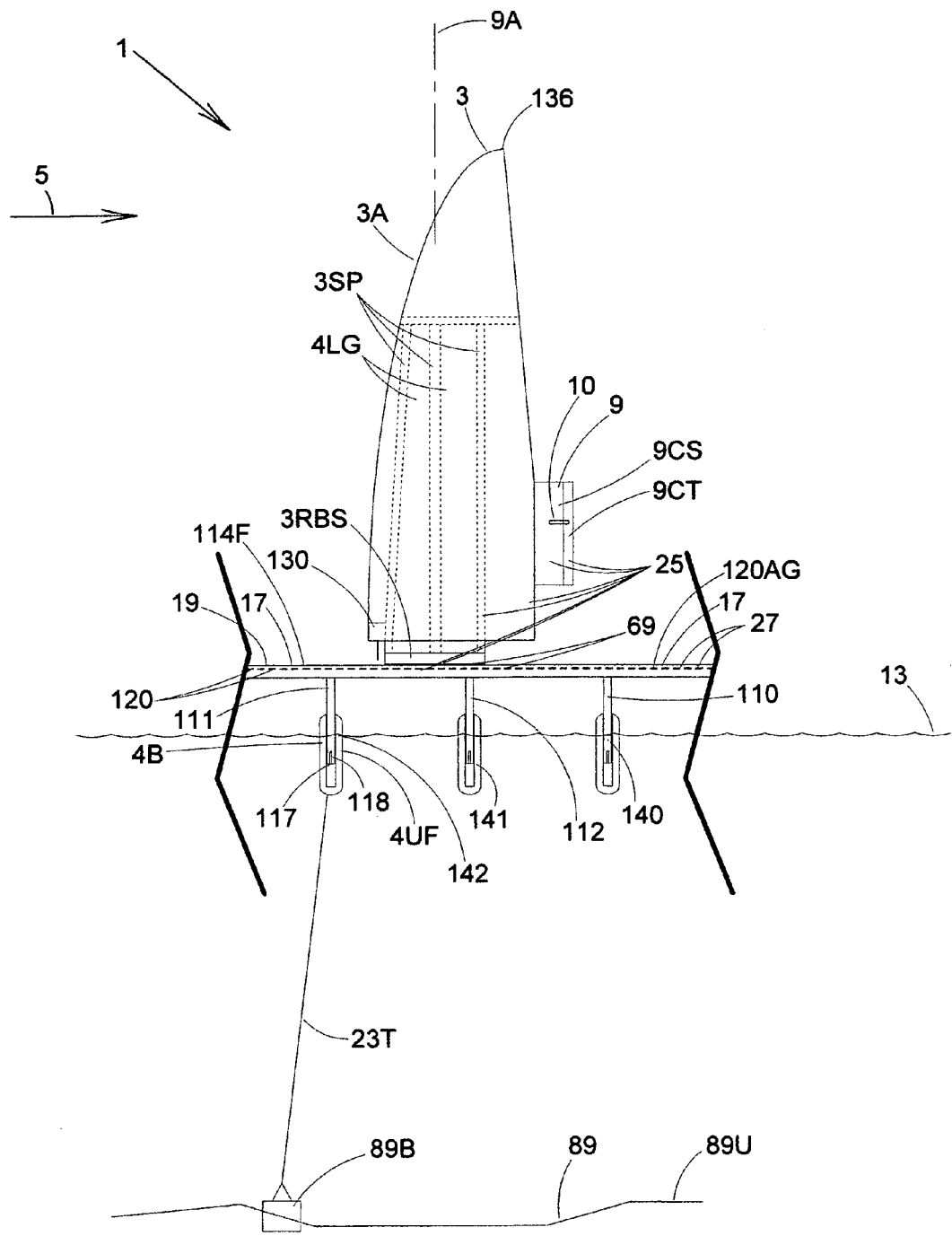
FIG. 2 shows an increased scale partial side view of another preferred embodiment of the invention from a location outside of the advancing airfoil means, illustrating the advancing airfoil means and adjacent structure.

FIG. 2 shows an increased scale partial side view of another preferred embodiment of the invention from a location outside of the advancing airfoil means, illustrating the advancing airfoil means and adjacent structure.

The preferred embodiment of FIG. 2 illustrates control system means 9 that utilizes actuator means 10 that acts on a control tab 9CT that controls a control surface 9CS that in turn acts on the airfoil means 3. No trailing edge flaps are provided in this illustrated embodiment. The actuator means 10 can utilize at least one of electrical actuation and electro-mechanical actuation and electro-hydraulic actuation and hydraulic actuation and pneumatic actuation and magnetic actuation and piezoelectric actuation and thermal actuation and shape memory alloy actuation.

The preferred embodiment of FIG. 2 also illustrates vertical load reacting means 110 for reacting vertical loads, said vertical loads comprising at least one of airfoil means weight loads and buoyant support means buoyancy loads, said vertical load reacting means comprising plural vertical-load-carrying structural members 111, wherein said vertical-load-carrying structural members 111 include a post 112 and a damper 117 and a shock absorber 118.

The preferred embodiment of FIG. 2 also illustrates revolving overhead windmill 1, wherein the wave load reduction means 140 comprises water surface penetrating members 142 with a total cross-sectional area on the plane of said water surface 13 when there are no waves, that is less than a corresponding total cross-sectional area that would occur for said rigid half-submerged toroidal ring on the plane of said water surface 13 when there are no waves.

Thus FIG. 2 in conjunction with the layout of the revolving overhead windmill 1 shown in FIG. 1A and the understanding of the annular volumes 101, 102, 103 and 104 as shown in FIGS. 1C and 1D, together show:

a revolving overhead windmill 1, comprising:

plural airfoil means 3 for contacting proximate flow fields of a wind current 5 when said wind current exists and carries wind current energy in the form of fluid-dynamic kinetic energy;

an effective axis of rotation 9A around which each of said airfoil means can effectively rotate in orientation to some extent, said axis of rotation being disposed within 60 degrees of vertical during normal operation of said revolving overhead windmill;

control system means 9 including actuator means 10, for controlling time-variable orientations of said airfoil means relative to said proximate flow fields of said wind current when said wind current exists and carries wind current energy in the form of fluid-dynamic kinetic energy;

buoyant support means 4B for utilizing a buoyancy force from fluid displacement to at least partially contribute to supporting said airfoil means 3 above a ground surface 89;

connecting means 17 for connecting said plural airfoil means in sequence in an annular volume 101, said connecting means including connecting members 19 that connect adjacently-located airfoil means in said sequence;

vertical load reacting means 110 for reacting vertical loads, said vertical loads comprising at least one of airfoil means weight loads and buoyant support means buoyancy loads, said vertical load reacting means comprising plural vertical-load-carrying structural members 111 arranged in sequence in a second annular volume 102 that is topologically coaxial with said annular volume;

and energy harvesting means 25 including said control system means 9, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means 3 at said time-variable orientations to contribute to driving said substantially periodic motion when said wind current 5 exists and carries wind current energy in the form of fluid-dynamic kinetic energy;

said energy harvesting means further including energy conversion means 27 for converting at least some of said net work into energy in a desired form for at least one of transmission, storage, processing and use.

Thus FIG. 2 in conjunction with the layout of the revolving overhead windmill 1 shown in FIG. 1A and the understanding of the annular volumes 101, 102, 103 and 104 as shown in FIGS. 1C and 1D, together show:

a revolving overhead windmill 1, comprising:

plural airfoil means 3 for contacting proximate flow fields of a wind current 5 when said wind current exists and carries wind current energy in the form of fluid-dynamic kinetic energy;

an effective axis of rotation 9A around which each of said airfoil means can effectively rotate in orientation to some extent, said axis of rotation being disposed within 60 degrees of vertical during normal operation of said revolving overhead windmill;

control system means 9 including actuator means 10, for controlling time-variable orientations of said airfoil means relative to said proximate flow fields of said wind current when said wind current exists and carries wind current energy in the form of fluid-dynamic kinetic energy;

buoyant support means 4B for utilizing a buoyancy force from fluid displacement comprising water displacement from a volume below a water surface 13, to at least partially contribute to supporting said airfoil means 3 above the water surface 13 and above a ground surface 89 wherein the ground surface is an underwater ground surface 89U;

connecting means 17 for connecting said plural airfoil means in sequence in an annular volume 101, said connecting means including connecting members 19 that connect adjacently-located airfoil means in said sequence;

wave load reduction means 140 for reducing peak wave-induced loads acting on said connecting means 17 relative to reference peak wave-induced loads that would occur if said connecting means were rigidly attached to and supported by a rigid half-submerged toroidal ring floating in the water directly beneath said connecting means 17, said wave load reduction means comprising plural load reduction elements 141 arranged in sequence in a third annular volume 103 that is topologically coaxial with said annular volume and energy harvesting means 25 including said control system means 9, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means 3 at said time-variable orientations to contribute to driving said substantially periodic motion when said wind current 5 exists and carries wind current energy in the form of fluid-dynamic kinetic energy;

said energy harvesting means further including energy conversion means 27 for converting at least some of said net work into energy in a desired form for at least one of transmission, storage, processing and use.

Thus FIG. 2 in conjunction with the layout of the revolving overhead windmill 1 shown in FIG. 1A and the understanding of the annular volumes 101, 102, 103 and 104 as shown in FIGS. 1C and 1D, together show:

a revolving overhead windmill 1, comprising:

plural airfoil means 3 for contacting proximate flow fields of a wind current 5 when said wind current exists and carries wind current energy in the form of fluid-dynamic kinetic energy;

an effective axis of rotation 9A around which each of said airfoil means can effectively rotate in orientation to some extent, said axis of rotation being disposed within 60 degrees of vertical during normal operation of said revolving overhead windmill;

control system means 9 including actuator means 10, for controlling time-variable orientations of said airfoil means relative to said proximate flow fields of said wind current when said wind current exists and carries wind current energy in the form of fluid-dynamic kinetic energy;

buoyant support means 4B for utilizing a buoyancy force from fluid displacement to at least partially contribute to supporting said airfoil means 3 above a ground surface 89;

connecting means 17 for connecting said plural airfoil means in sequence in an annular volume 101, said connecting means including connecting members 19 that connect adjacently-located airfoil means in said sequence;

and energy harvesting means 25 including said control system means 9, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means 3 at said time-variable orientations to contribute to driving said substantially periodic motion when said wind current 5 exists and carries wind current energy in the form of fluid-dynamic kinetic energy;

said energy harvesting means further including energy conversion means 27 for converting at least some of said net work into energy in a desired form for at least one of transmission, storage, processing and use;

said energy conversion means 27 including an annular electromagnetic generator 120 located in a fourth annular volume 104 that is topologically coaxial with said annular volume.

Thus FIG. 2 in conjunction with the layout of the revolving overhead windmill 1 shown in FIG. 1A and the understanding of the annular volumes 101, 102, 103 and 104 as shown in FIGS. 1C and 1D, together show:

a revolving overhead windmill 1, wherein said vertical-load-carrying structural members 111 include at least one of (i) a post 112 and (ii) a truss 113 and (iii) an annular truss 113A and (iv) a floating annular truss 113FA and (v) a pivoting structural member 114 and (vi) a cable 115 and (vii) a stretchable cord 116 and (viii) a damper 117 and (ix) a shock absorber 118.

Figure 3A:
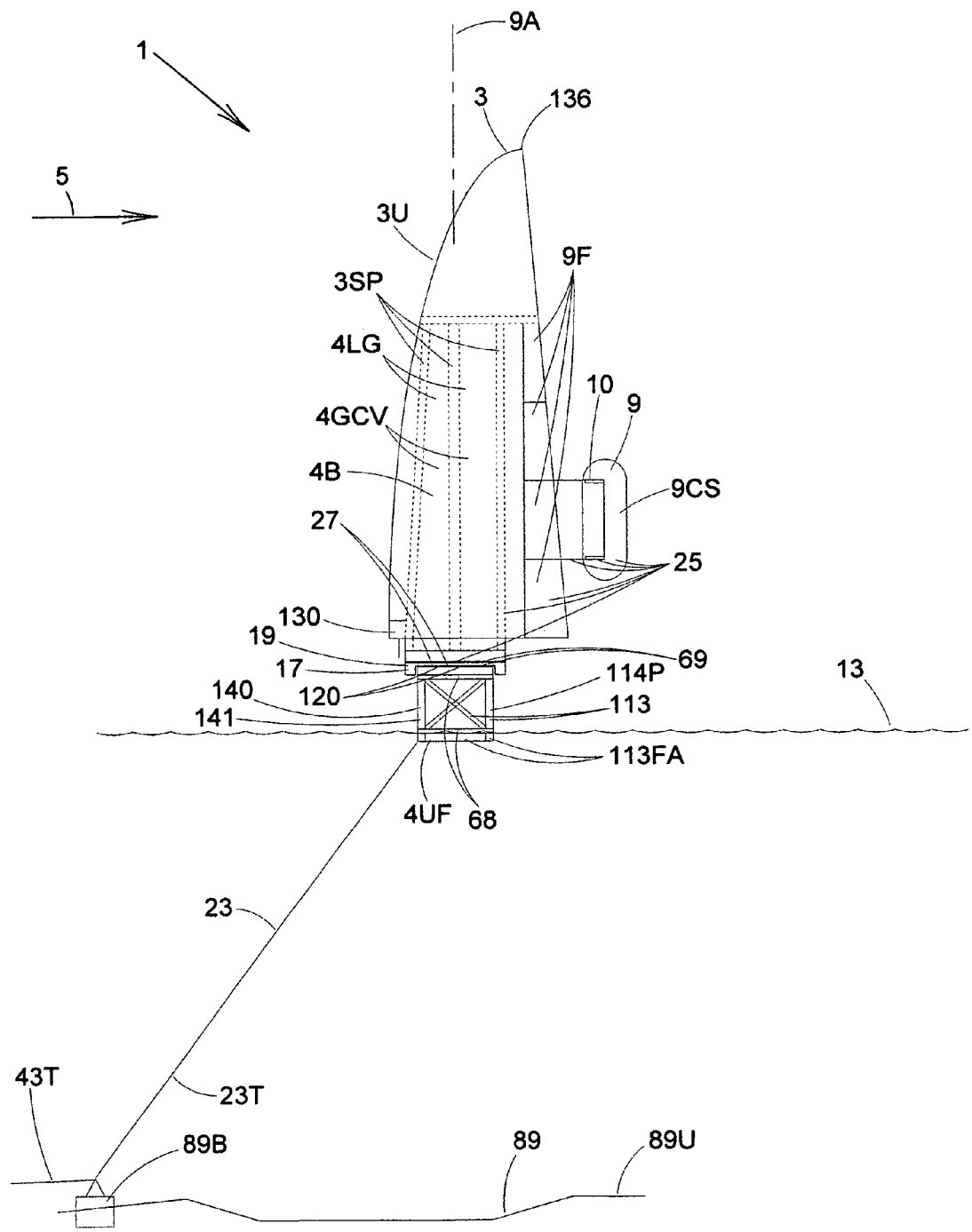
FIG. 3A shows an increased scale partial side view of another preferred embodiment of the invention, illustrating inventive features of the aerostatically supported upwind airfoil means and adjacent structure.

FIG. 3A shows an increased scale partial side view of another preferred embodiment of the invention, illustrating inventive features of the aerostatically supported upwind airfoil means 3U and adjacent structure.

In FIG. 3A, the gaseous content volumes 4GCV are used to serve as lifting gas chambers 4LG, and serve as buoyant support means 4B. The embodiment of FIG. 3A also illustrates the use of load reduction elements 141 that include a pivoting structural member 114P.

Figure 3B:
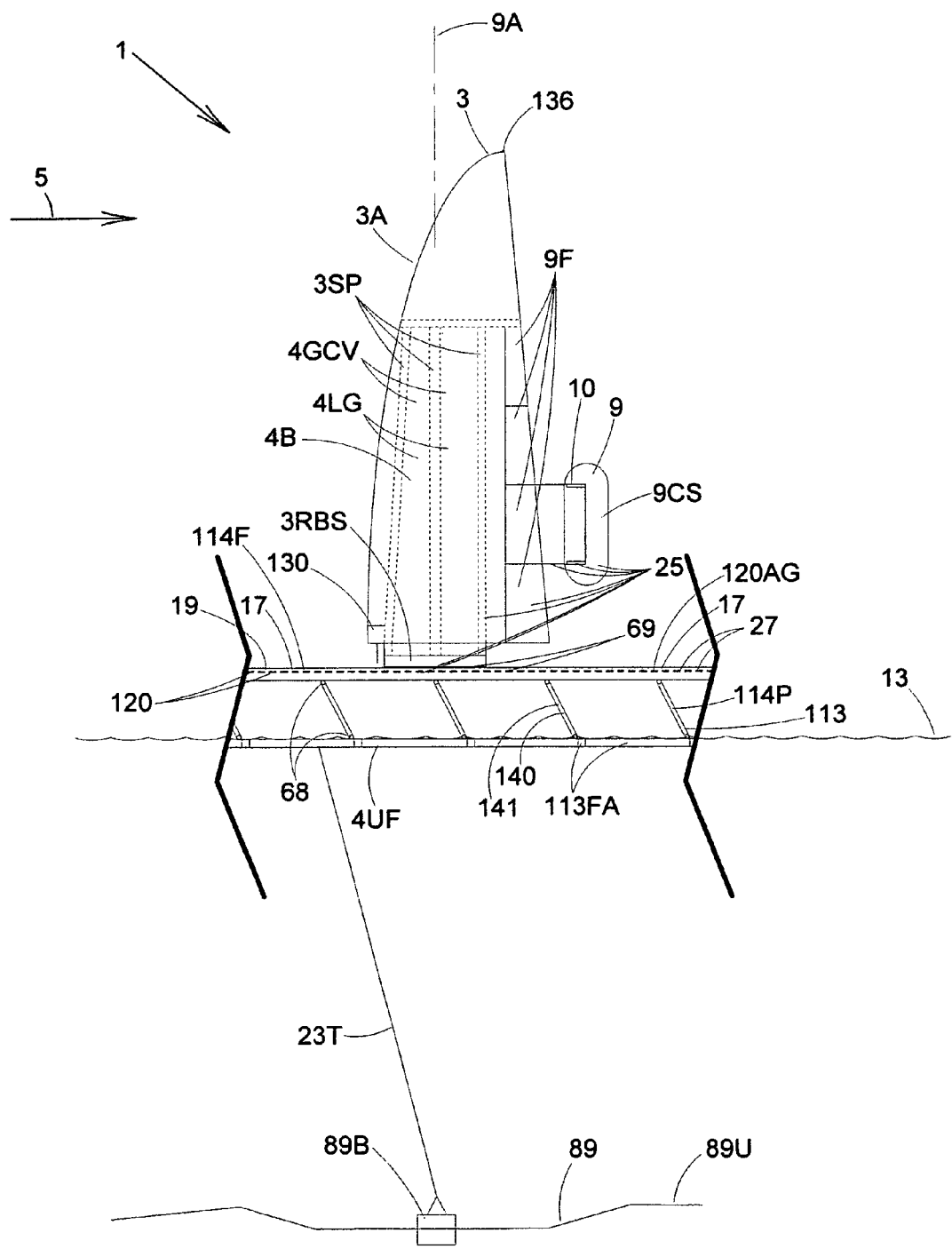
FIG. 3B shows an increased scale partial side view of the same preferred embodiment of the invention as in FIG. 3A, from a location outside of the advancing airfoil means, illustrating the aerostatically supported advancing airfoil means and adjacent structure.

FIG. 3B shows an increased scale partial side view of the same preferred embodiment of the invention as in FIG. 3A, from a location outside of the advancing airfoil means, illustrating the aerostatically supported advancing airfoil means and adjacent structure. This view of the embodiment also illustrates the use of load reduction elements 141 that include a flexible structural member 114F, built into the connecting means 17 to enable the revolving overhead windmill 1 to better withstand storm-related load conditions by allowing some degree of engineered flexure. This view also shows a near-planar floating annular truss 113FA, with the lighter-than-air subsystem above held in place with some allowed movement, by the pivoting structural members 114P that can pivot as needed to react aerostatic loads and wind-driven thrust loads on the airfoil means 3.

Figure 4:
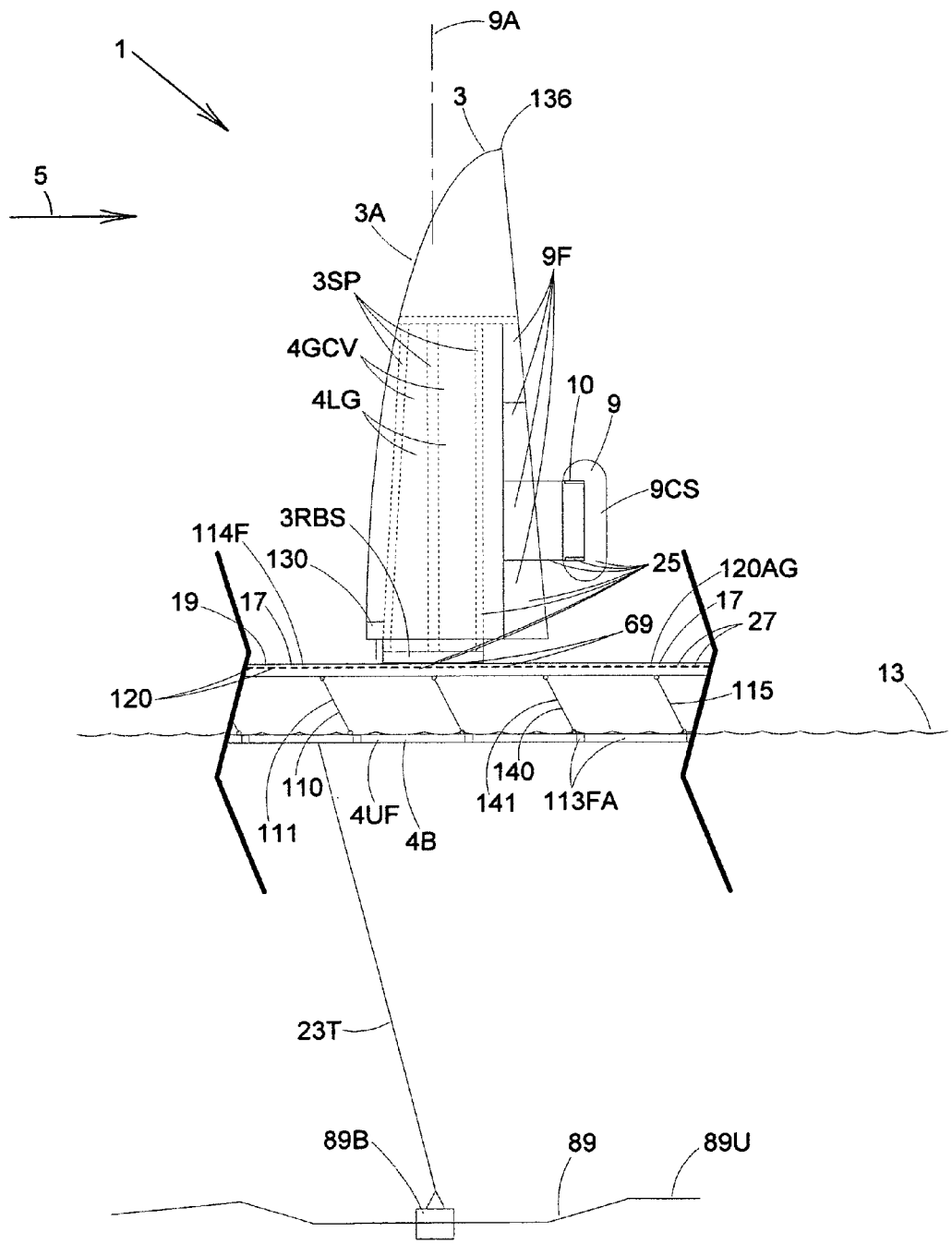
FIG. 4 shows an increased scale partial side view of another preferred embodiment of the invention from a location outside of the advancing airfoil means, illustrating the aerostatically supported advancing airfoil means and adjacent structure.

FIG. 4 shows an increased scale partial side view of another preferred embodiment of the invention from a location outside of the advancing airfoil means, illustrating the aerostatically supported advancing airfoil means and adjacent structure.

The embodiment of FIG. 4 also illustrates the use of load reduction elements that include cables 115 that can pivot as needed to react aerostatic loads and wind-driven thrust loads on the lighter-than-air airfoil means 3. More specifically, the embodiment of FIG. 4 illustrates a revolving overhead windmill 1, comprising: plural airfoil means 3 for contacting proximate flow fields of a wind current 5 when said wind current exists and carries wind current energy in the form of fluid-dynamic kinetic energy; an effective axis of rotation 9A around which each of said airfoil means can effectively rotate in orientation to some extent, said axis of rotation being disposed within 60 degrees of vertical during normal operation of said revolving overhead windmill; control system means 9 including actuator means 10, for controlling time-variable orientations of said airfoil means relative to said proximate flow fields of said wind current when said wind current exists and carries wind current energy in the form of fluid-dynamic kinetic energy; buoyant support means for utilizing a buoyancy force from fluid displacement to at least partially contribute to supporting said airfoil means 3 above a ground surface 89, wherein said buoyant support means utilizes a buoyancy force from fluid displacement comprising displacement of air utilizing a lifting gas chamber 4LG; connecting means 17 for connecting said plural airfoil means in sequence in an annular volume, said connecting means 17 including connecting members 19 that connect adjacently-located airfoil means in said sequence; and energy harvesting means 25 including said control system means 9, for converting a portion of said fluid-dynamic kinetic energy into net work on said airfoil means over the course of a cycle of substantially periodic motion of said airfoil means 3 revolving in said annular volume, by utilizing time-variable fluid-dynamic pressure distributions and resulting forces acting on said airfoil means 3 at said time-variable orientations to contribute to driving said substantially periodic motion when said wind current 5 exists and carries wind current energy in the form of fluid-dynamic kinetic energy; said energy harvesting means further including energy conversion means 27 for converting at least some of said net work into energy in a desired form for at least one of transmission, storage, processing and use; said energy conversion means 27 including an annular electromagnetic generator 120 located in a fourth annular volume that is topologically coaxial with said annular volume; wherein said energy harvesting means 25 including said annular electromagnetic generator 120, is connected to plural vertical-load-carrying structural members 111 arranged in sequence in a second annular volume that is topologically coaxial with said annular volume, said plural vertical-load-carrying structural members 111 comprising plural separated elongated structural members spaced around said second annular volume; wherein each said elongated structural member comprises at least one of a cable 115 (illustrated here), a stretchable cord, a pivoting structural member, a post and a guy wire; and wherein each said elongated structural member has a length less than half the height of said airfoil means 3 and is capable of carrying some tension loading in a circumferential direction associated with circumferential forces between (i) revolving upper structure (here including connecting means 17 above the air gap 120AG) of said revolving overhead windmill 1 and (ii) nonrevolving lower structure (here including tether 23T and floating annular truss 113FA) of said revolving overhead windmill 1.

Figure 5:
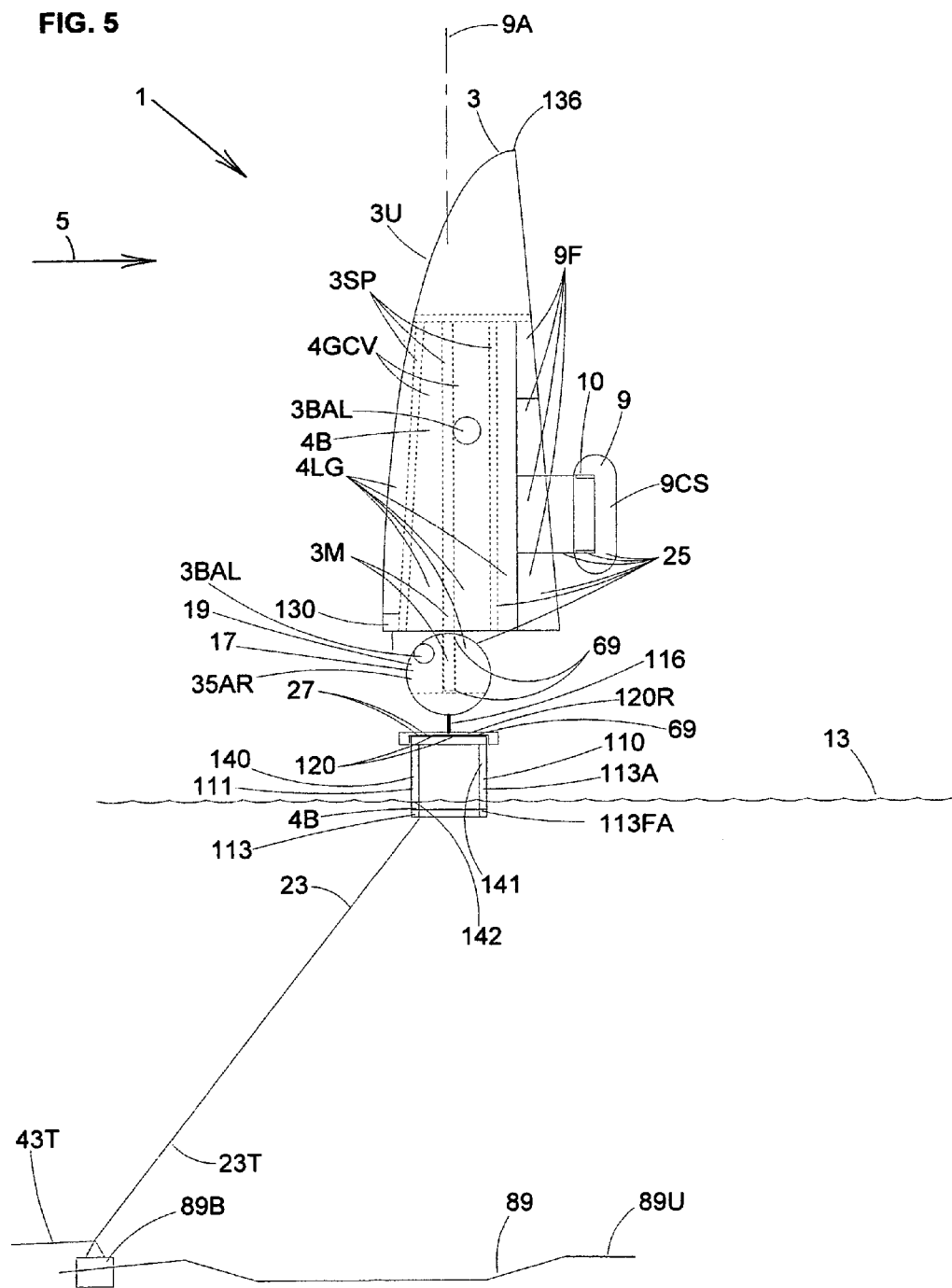
FIG. 5 shows an increased scale partial side view of another preferred embodiment of the invention, illustrating inventive features of the aerostatically supported upwind airfoil means and adjacent structure.

FIG. 5 shows an increased scale partial side view of another preferred embodiment of the invention, illustrating inventive features of the aerostatically supported upwind airfoil means and adjacent structure.

The revolving overhead windmill 1 is supported by aerostatic buoyancy forces in a manner analogous to aerostatically supported dirigibles, airships or balloons. The revolving overhead windmill 1 includes a plurality of airfoil means (or "windfoil" means) 3 that are filled in considerable part with lifting gas 3LG such as at least one of helium, hydrogen, other lifting gas and hot air; and connecting means 17 comprising a substantially toroidal ring structure that is an airfoil assembly support ring 35AR, that is also preferably inflated with lifting gas 3LG. If hydrogen is used as some or all of the lifting gas, it can optionally be re-supplied from electrolysis of water using energy from energy conversion means 27 to produce hydrogen, which can be fed by a pipe (not shown so as not to clutter the Figure) to the inflated elements to replace leakage losses of the lifting gas (any additional hydrogen produced could optionally be sent by pipe or barge or ship to end user entities on shore). Lightweight structure for the airfoil means 3 and the support ring 35AR may both use advanced strong and light materials such as advanced composites, advanced fabrics and advanced metallic elements, and construction architectures such as those used in rigid, semirigid or nonrigid airships, for example.

FIG. 5 also illustrates inflatable elements that include variable volume control using ballonets 3BAL as known from the prior art of dirigibles, to vary aerostatic lift acting on the airfoil means 3.

FIG. 5 also shows the main or center spar 3SP serving as a mast 3M, with the bottom of the mast 3M allowed to pivot in azimuth or yaw using bearings 69 at the locations illustrated.

The embodiment of FIG. 5 also illustrates the use of load reduction elements that include a stretchable cord 116 that can pivot as needed to react aerostatic loads and wind-driven thrust loads on the lighter-than-air airfoil means 3 and assembly support ring 35AR.

The distributed aero buoyancy around the perimeter of a large annulus, reduces water displacement of floating annular truss 113FA, which in turn also enables reduced wave induced vertical loads for given wave height and wavelength.

The preferred embodiment of FIG. 5, in conjunction with the plan view configuration of the invention as shown in FIG. 1A, also illustrates:

a revolving overhead windmill of claim 1, wherein said buoyant support means 4B utilizes at least one of (i) a buoyancy force from fluid displacement comprising displacement of water utilizing an underwater float member 4UF, and (ii) a buoyancy force from fluid displacement comprising displacement of air utilizing a lifting gas chamber 4LG.

FIG. 6 shows an increased scale partial side view of another preferred embodiment of the invention, illustrating inventive features of the aerostatically supported upwind airfoil means and adjacent structure, sited over a layer of moving water 13M, such as (without limitation) a floodplain in a flood state, or tidelands with maximum high tides, or marshlands following heavy monsoon rains, or an arroyo or wash following heavy precipitation, or similar or analogous situations of a variable or a temporary layer of moving water.

In this embodiment, vertical load reacting means 110 for reacting vertical loads comprising at least one of airfoil means weight loads and buoyant support means buoyancy loads, include plural vertical-load-carrying structural members 111, which in turn include posts 112 braced by guy wires 112G. Position keeping means 23 here comprise installation of the posts 112 in the ground surface 89.

Figure 7A:
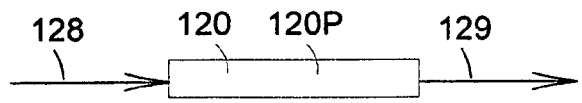
FIG. 7A through 7N show, in block diagram form, several alternate generator means for converting mechanical "net work" to "energy in a desired form for at least one of transmission, storage, processing and use" in one preferred form as electrical energy.
Figure 7B:
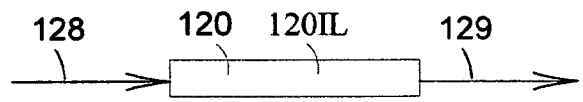
Figure 7C:
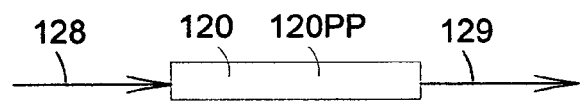
Figure 7D:
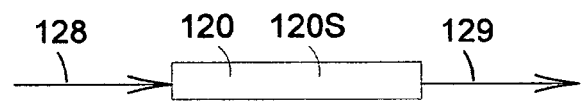
Figure 7E:
Figure 7F:
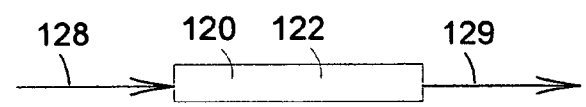
Figure 7G:
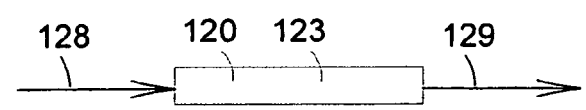
Figure 7H:
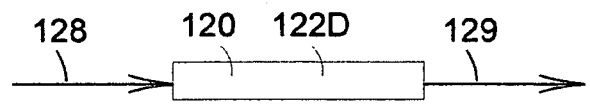
Figure 7I:
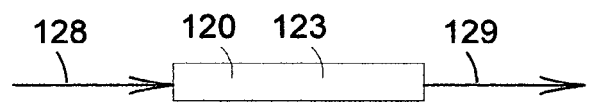
Figure 7J:
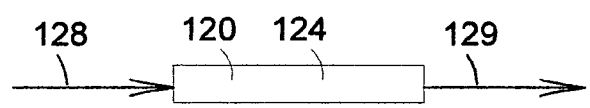
Figure 7K:
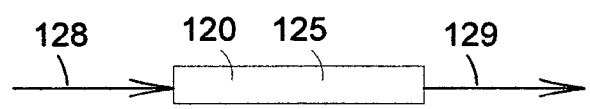
Figure 7L:
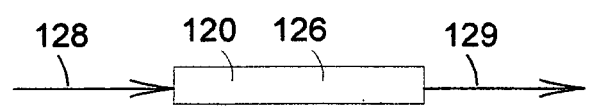
Figure 7M:
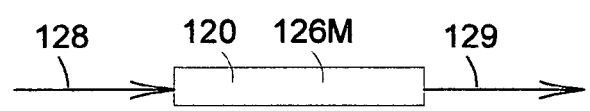
Figure 7N:
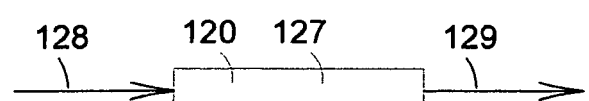

FIG. 7A through 7N show, in block diagram form, several alternate generator means for converting mechanical net work 128 to "energy in a desired form for at least one of transmission, storage, processing and use" in one preferred form as electrical energy 129.

The preferred embodiment of FIG. 7A through 7N, in conjunction with the plan view configuration of the invention as shown in FIG. 1A, also illustrates:

a revolving overhead windmill 1,
wherein said energy conversion means 27 includes at least one of (i) an annular electromagnetic generator 120 located in a fourth annular volume 104 that is topologically coaxial with said annular volume 101, and (ii) an electrical generator using an electromagnet 121 and (iii) an induction generator 122 and (iv) a doubly fed induction generator 122D and (v) a field excited synchronous generator 123 and (vi) a gear-driven generator 124 and (vii) a direct-drive generator 125 and (viii) an AC generator 126 and (ix) a multiphase AC generator 126M and (x) a DC generator 127.

The preferred embodiment of FIG. 7A through 7N, in conjunction with the plan view configuration of the invention as shown in FIG. 1A, also illustrates:

a revolving overhead windmill 1, wherein said annular electromagnetic generator 120 comprises at least one of (i) a permanent magnet generator 120P and (ii) a permanent magnet synchronous generator 120S and (iii) a pancake permanent magnet generator 120PP and (iv) a direct drive permanent magnet generator with an ironless stator core 120IL and (v) a permanent magnet generator with at least one of rigid wheels and rigid rollers and rigid ball bearings that serve as means 120RW for maintaining a small and substantially constant air gap between stator and rotor members.

FIG. 8 shows a plan view of multiple revolving overhead windmills 1 in an array, with shared anchors 89B in the underwater ground surface 89U.

FIG. 9 shows a plan view of a revolving overhead windmill 1 being towed to its installation site by a tugboat 95TB in a tow direction 95D using a tow cable 95C.

FIGS. 10A through 10D illustrate aspects of control system means for controlling the revolving overhead windmill.

Figure 10A:
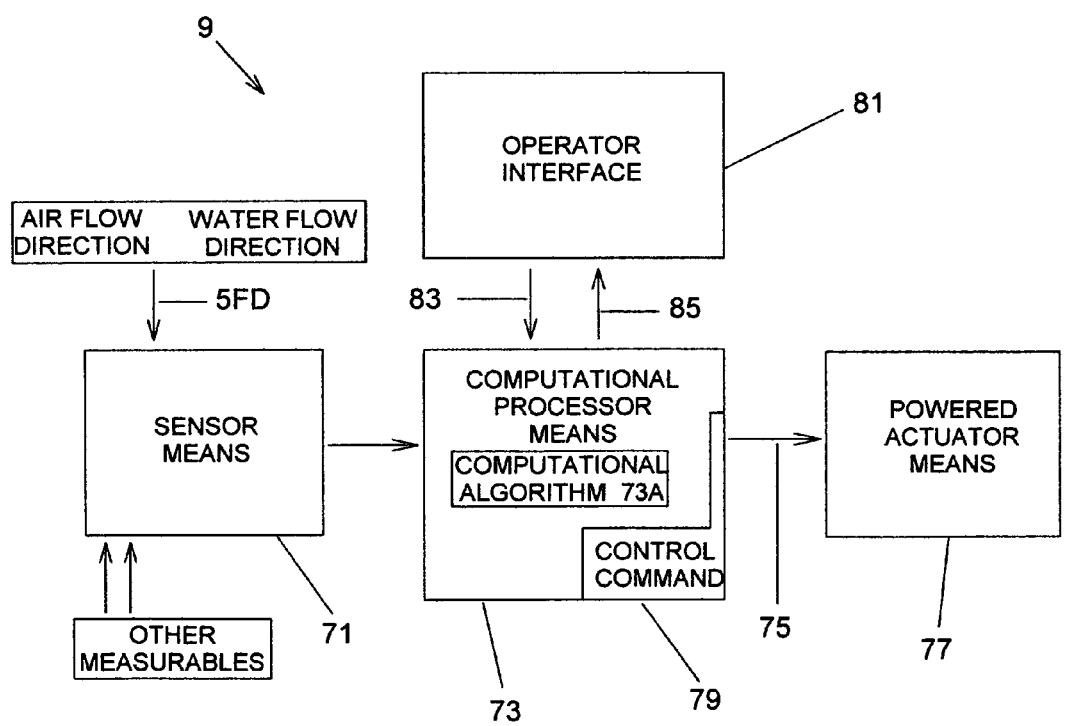
FIGS. 10A through 10D illustrate aspects of control system means for controlling the revolving overhead windmill.

FIG. 10A illustrates a representative control system block diagram for a revolving overhead windmill, wherein control system means 9 including actuator means, for controlling time-variable orientations of fluid-foil means, comprises (i) sensor means 71 for sensing a flow direction 5FD comprising at least one of an air flow direction (of an air current such as a wind) and a water flow direction (of a water current such as an ocean current or tidal current or river current) and optionally for sensing other measurables, (ii) computational processor means 73 with at least one computational algorithm 73A for generating a control command 79 as a function of said flow direction 5FD, (iii) at least one powered actuator means 77 for executing the control command 79, and (iv) at least one signal transmission means 75 for transmitting a signal containing said control command 79 from said computational processor means 73 to said powered actuator means 77. [c11] The powered actuator means 73 can either directly control the orientation of fluid-foil means (that can include one or both of airfoil means 3A and water foil means 3WF), e.g. with a rotary or linear actuator or actuators, and/or indirectly control orientation of fluid-foil means using a control tab or other means for controlling including means for controlling at least one of a control surface 9CS, tab 3TAB, flap 3F, blown flap 3BF, slat 3SL, and morphing shape aerodynamic member 3MSA [not shown in this Figure but shown earlier]. FIG. 10A also illustrates an optional operator interface 81 sending operator command(s) 83 to computational processor means 73 and receiving at least one of data and annunciation(s) 85 to an operator. An operator may actively control operation of the fluid-dynamic renewable harvesting system, or in alternate embodiments monitor its automatic operation and only intervene or override for non-normal, failure or emergency situations.

Figure 10B:
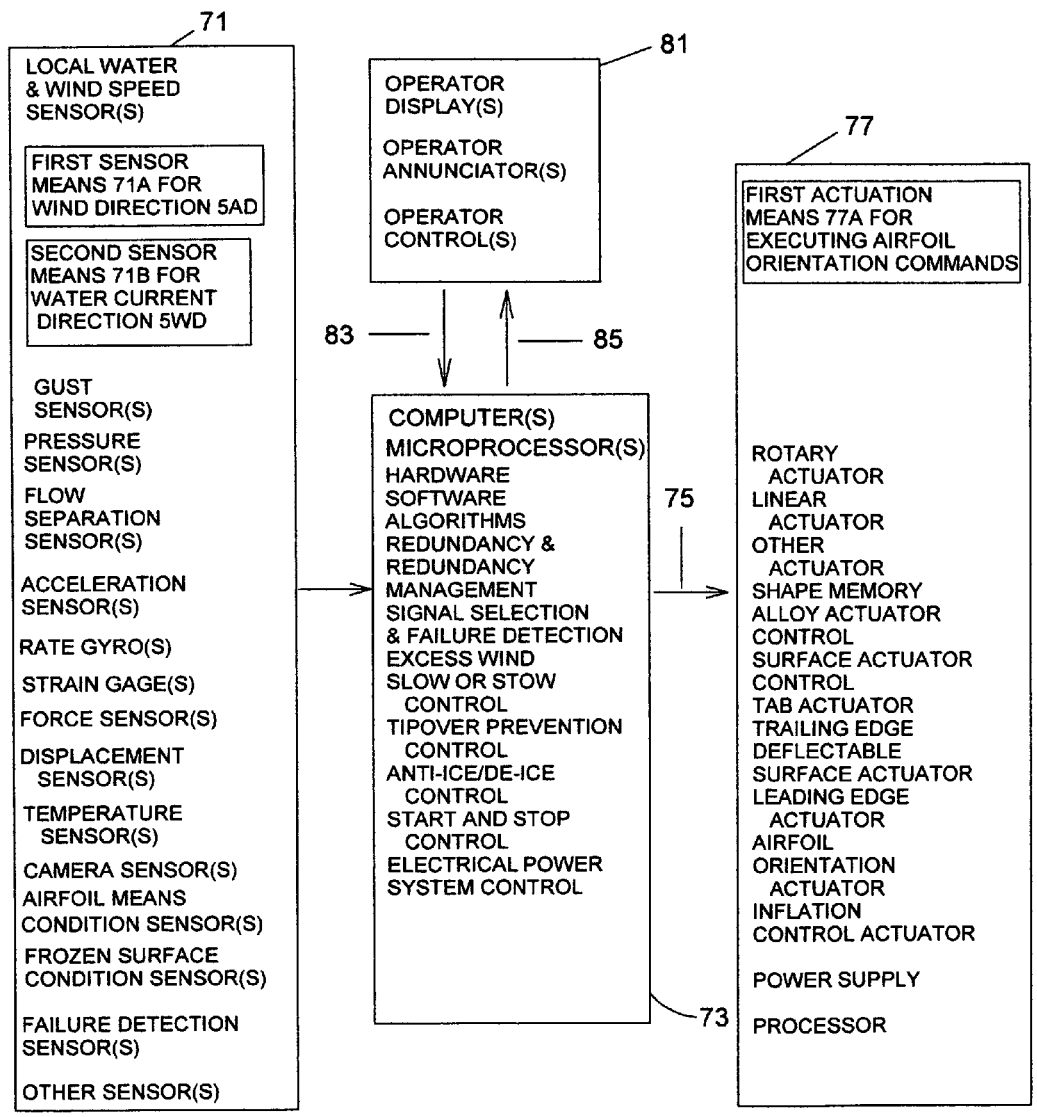

FIG. 10B illustrates several optional sub-elements which may reside in each of the blocks of the control system shown in FIG. 10A. The elements in the sensor means 71 could include a local wind speed sensor, local water speed sensor, air or wind flow direction sensor, water flow direction sensor(s) at one or more depths, gust sensor, pressure sensor, acceleration sensor, rate gyro, force sensor, displacement sensor, temperature sensor, camera sensor, fluid-foil condition sensor, icing condition sensor, failure detection sensor and/or other sensor(s). The computational processor means 73 could include a computer, a microprocessor, hardware, software algorithms, redundancy and redundancy management, sensor signal selection and failure detection, excess wind stow or slow control, tipover prevention control, anti-ice/de-ice control, start and stop control and/or electrical power system control. The powered actuator means 77 could include a rotary actuator, a linear actuator, other actuator, a shape memory alloy actuator, a control surface actuator, a control tab actuator, a trailing edge deflectable surface actuator, a leading edge actuator, a fluid-foil orientation actuator, an inflation control actuator, an actuator power supply and/or actuator processor. The optional operator interface 81 could include one or more of an operator display, an operator annunciator, and/or an operator control.

Figure 10C:
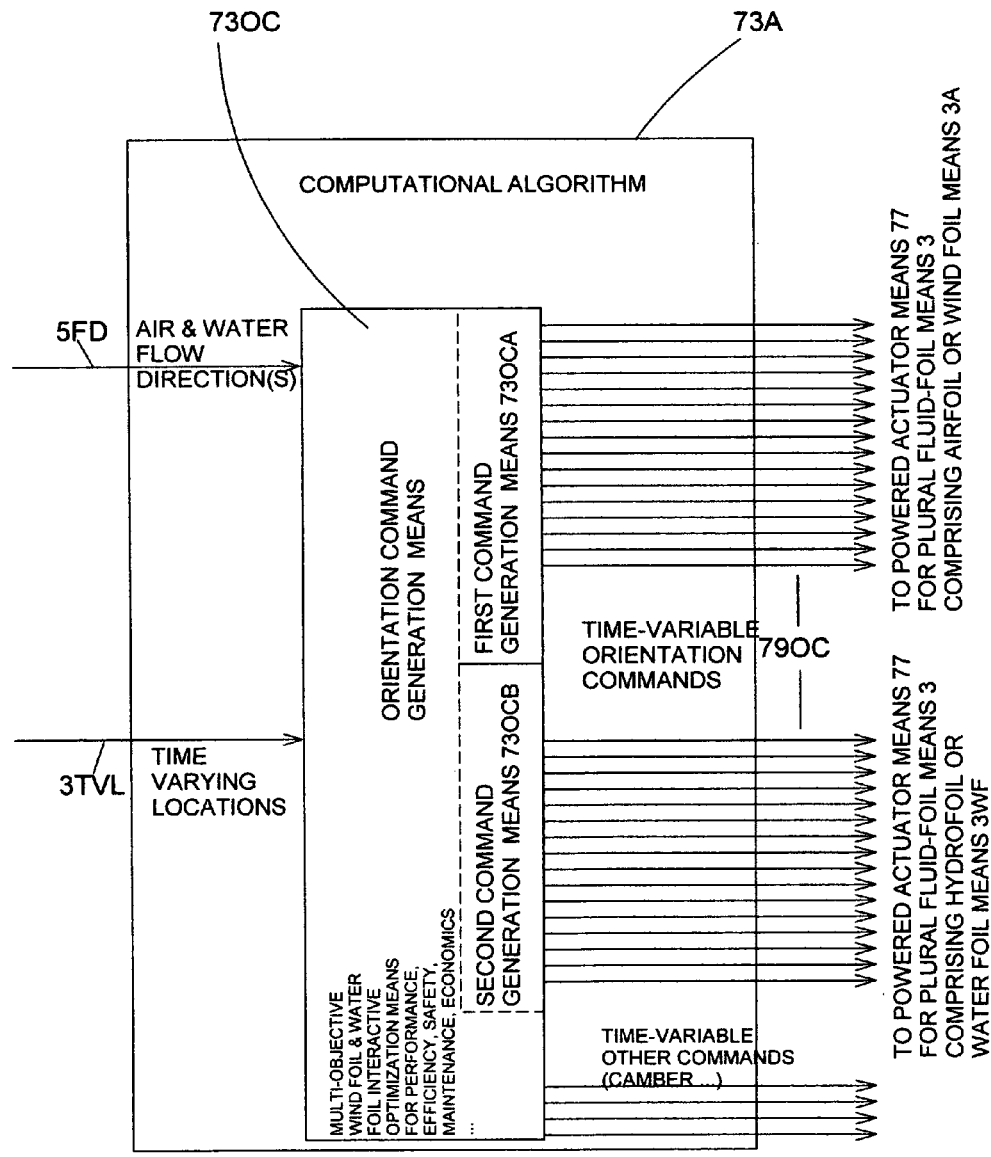

FIG. 10C illustrates for a revolving overhead windmill, a computational algorithm 73A that comprises orientation command generation means 73OC for generating time-variable orientation commands 79OC for each of plural airfoil means 3 as a function of at least one of said flow direction 5FD and time-varying location 3TVL of at least one of said plural airfoil means 3, which time-variable orientation commands if properly executed by the at least one powered actuator means 77, would result in time-variable orientations of said plural airfoil means 3 that tend to substantially maximize the net work on the airfoil means 3 over the course of a cycle of substantially periodic motion of the fluid-foil means, through time-variable fluid-dynamic pressure distributions that tend to substantially maximize resulting forces acting on the airfoil means 3 to drive said substantially periodic motion when a fluid current comprising an air current and/or water current exists and carries energy in the form of fluid-dynamic kinetic energy. The fluid-foil means includes airfoil means.

FIG. 10C illustrates for a revolving overhead windmill, the additional feature comprising at least one of first command generation means 73OCA for commanding orientations of airfoil or wind foil means to beneficially harvest wind or air current energy, and optionally second command generation means 73OCB for commanding orientations of hydrofoil or water foil means to beneficially harvest water current energy.

Figure 10D:
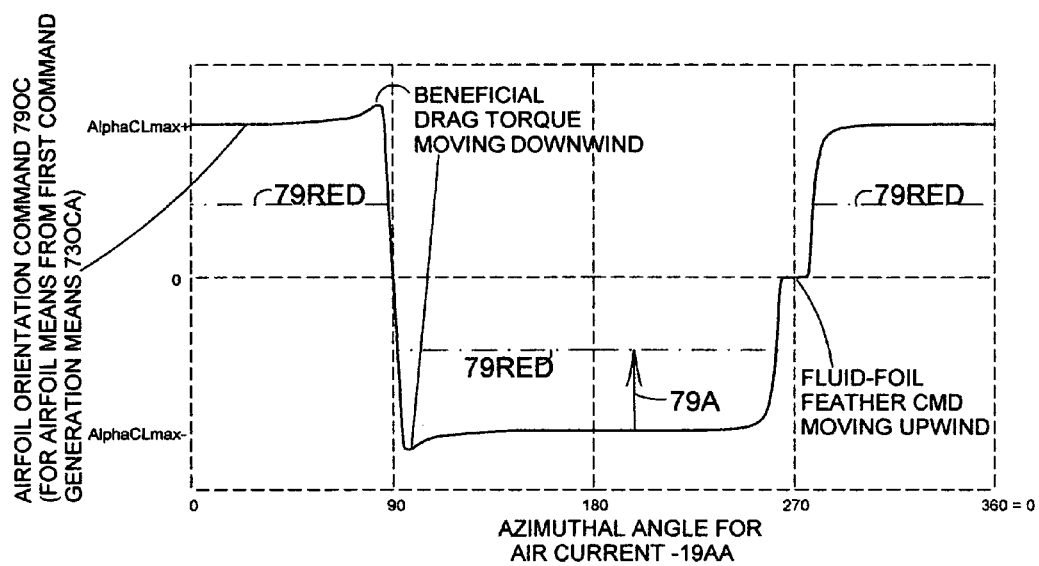

FIG. 10D illustrates for a wind or air current, a representative fluid-foil orientation command 79OC schedule (for airfoil or wind foil means) as a function of the azimuthal angle 19AA along the rotational direction of motion 19RD, starting with 0 at incoming air flow direction, as described earlier in the context of FIG. 3A. In this representative preferred schedule, note that the fluid-foil is commanded to a maximum lift coefficient ($C_L$) orientation for the crosswind legs of its motion, while it can be commanded to a beneficial drag torque orientation on the peak downwind leg of motion near 90 deg azimuthal angle, and to a minimum drag feathered orientation on the peak upwind leg of motion near 270 deg azimuthal angle. Variant algorithms for fluid-foil orientation commands as a function of various sensor inputs and to achieve multiple objectives, are possible within the spirit and scope of the invention as claimed. For excessively high wind speed or storm conditions where the airfoils may be at risk of excess loads or of tipping over, the orientation commands can be diminished or reduced as shown in the dot-dashed lines for reduced magnitude orientation commands 79RED. The reduced magnitude orientation commands can optionally vary in magnitude as a function of azimuthal angle and other parameters such as wind speed or algorithmically calculated tipping risk.

FIG. 10D thus illustrates for a fluid-dynamic renewable energy harvesting system, the additional feature comprising a airfoil command modification means 79A in said first command generation means 73OCA, for modifying said airfoil orientation commands to avoid potential harm when said airfoil means 3A are at risk of harm from at least one of wind loads and tipping.

Note that the type of orientation command vs. azimuthal angle schedules shown in FIG. 10D will yield considerably greater energy extracted than a simple sinusoidal or similar fixed schedule orientation control. Note also that individual local flow speed and direction sensors for air and/or water flow may provide additional input to optimize each fluid foil orientation for wind foils and/or water foils at each instant, including considerations of downwash, wake, and local flow variations both natural and induced by other fluid foils.

FIGS. 10A through 10D collectively disclose for a revolving overhead windmill, control system means 9 that includes first sensor means 71A for at least one of measuring and estimating wind direction plus first command generation means 73OCA for generating airfoil orientation commands intended to control said time-variable orientations of airfoil means 3A that are members of said airfoil means 3 plus first actuation means 77A for executing said airfoil orientation commands.

In one particular variant embodiment the airfoil orientation commands comprise a discrete set of airfoil orientation commands including (i) zero angle of attack relative to said wind direction 5AD, (ii) angle of attack corresponding to maximum airfoil lift coefficient acting towards the right hand side from a perspective oriented against the wind direction 5AD, and (iii) angle of attack corresponding to maximum airfoil lift coefficient acting towards the left hand side from a perspective oriented against the wind direction 5AD.

While certain preferred embodiments of the invention have been described in detail above with reference to the accompanying Figures, it should be understood that further variations and combinations and alternate embodiments are possible within the spirit and scope of the invention as claimed and described herein.

What is claimed is:

1. A revolving overhead windmill, comprising:
   plural airfoil means for contacting proximate flow fields of a wind current when said wind current exists and carries wind current energy in the form of fluid-dynamic kinetic energy;
   an effective axis of rotation around which each of said airfoil means can effectively rotate in orientation to some extent, said axis of rotation being disposed within 60 degrees of vertical during normal operation of said revolving overhead windmill;
   control system means including actuator means, for controlling time-variable orientations of said airfoil means relative to said proximate flow fields of said wind current when said wind current exists and carries wind current energy in the form of fluid-dynamic kinetic energy;
   buoyant support means for utilizing a buoyancy force from fluid displacement to at least partially contribute to supporting said airfoil means above a ground surface;
   connecting means for connecting said plural airfoil means in sequence in an annular volume, said connecting means including connecting members that connect adjacently-located airfoil means in said sequence;
   vertical load reacting means for reacting vertical loads, said vertical loads comprising at least one of airfoil means weight loads and buoyant support means buoyancy loads, said vertical load reacting means comprising plural vertical-load-carrying structural members arranged in sequence in a second annular volume that is topologically coaxial with said annular volume;
   and
   energy harvesting means including said control system means, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means at said time-variable orientations to contribute to driving said substantially periodic motion when said wind current exists and carries wind current energy in the form of fluid-dynamic kinetic energy;
   said energy harvesting means further including energy conversion means for converting at least some of said net work into energy in a desired form for at least one of transmission, storage, processing and use; wherein said energy harvesting means utilizes relative motion between (i) revolving structure connected to said airfoil means revolving in said annular volume and driving said substantially periodic motion when said wind current exists and carries wind current energy in the form of fluid-dynamic kinetic energy, and (ii) nonrevolving connected structure including said vertical-load-carrying structural members arranged in sequence in said second annular volume, said vertical-load-carrying structural members comprising elongated structural members making plural separated penetrations through a water surface, with portions of said elongated structural members below said water surface displacing water to generate said buoyancy loads and to thereby serve as plural separated float members, said buoyancy loads associated with said plural separated float members further providing at least contributory support to support said energy conversion means above said water surface.

2. A revolving overhead windmill, comprising:
   plural airfoil means for contacting proximate flow fields of a wind current when said wind current exists and carries wind current energy in the form of fluid-dynamic kinetic energy;
   an effective axis of rotation around which each of said airfoil means can effectively rotate in orientation to some extent, said axis of rotation being disposed within 60 degrees of vertical during normal operation of said revolving overhead windmill;
   control system means including actuator means, for controlling time-variable orientations of said airfoil means relative to said proximate flow fields of said wind current when said wind current exists and carries wind current energy in the form of fluid-dynamic kinetic energy;

buoyant support means for utilizing a buoyancy force from fluid displacement comprising water displacement from a volume below a water surface, to at least partially contribute to supporting said airfoil means above the water surface and above a ground surface wherein the ground surface is an underwater ground surface;

connecting means for connecting said plural airfoil means in sequence in an annular volume, said connecting means including connecting members that connect adjacently-located airfoil means in said sequence;

wave load reduction means for reducing peak wave-induced loads acting on said connecting means relative to reference peak wave-induced loads that would occur if said connecting means were rigidly attached to and supported by a rigid half-submerged toroidal ring floating in the water directly beneath said connecting means, said wave load reduction means comprising plural load reduction elements arranged in sequence in a third annular volume that is topologically coaxial with said annular volume and energy harvesting means including said control system means, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means at said time-variable orientations to contribute to driving said substantially periodic motion when said wind current exists and carries wind current energy in the form of fluid-dynamic kinetic energy;

said energy harvesting means further including energy conversion means for converting at least some of said net work into energy in a desired form for at least one of transmission, storage, processing and use; wherein said energy harvesting means utilizes relative motion between (i) said connecting means for connecting said plural airfoil means, serving as revolving structure connected to said airfoil means, revolving in said annular volume and driving said substantially periodic motion when said wind current exists and carries wind current energy in the form of fluid-dynamic kinetic energy, and (ii) nonrevolving connected structure including said plural load reduction elements arranged in sequence in said third annular volume, said load reduction elements comprising elongated structural members making plural separated penetrations through said water surface, with portions of said elongated structural members below said water surface displacing water to serve as plural separated float members, with said plural separated float members together serving as said buoyant support means.

3. A revolving overhead windmill, comprising:

plural airfoil means for contacting proximate flow fields of a wind current when said wind current exists and carries wind current energy in the form of fluid-dynamic kinetic energy;

an effective axis of rotation around which each of said airfoil means can effectively rotate in orientation to some extent, said axis of rotation being disposed within 60 degrees of vertical during normal operation of said revolving overhead windmill;

control system means including actuator means, for controlling time-variable orientations of said airfoil means relative to said proximate flow fields of said wind current when said wind current exists and carries wind current energy in the form of fluid-dynamic kinetic energy;

buoyant support means for utilizing a buoyancy force from fluid displacement to at least partially contribute to supporting said airfoil means above a ground surface, wherein said buoyant support means utilizes a buoyancy force from fluid displacement comprising displacement of air utilizing a lifting gas chamber;

connecting means for connecting said plural airfoil means in sequence in an annular volume, said connecting means including connecting members that connect adjacently-located airfoil means in said sequence;

and energy harvesting means including said control system means, for converting a portion of said fluid-dynamic kinetic energy into net work on said airfoil means over the course of a cycle of substantially periodic motion of said airfoil means revolving in said annular volume, by utilizing time-variable fluid-dynamic pressure distributions and resulting forces acting on said airfoil means at said time-variable orientations to contribute to driving said substantially periodic motion when said wind current exists and carries wind current energy in the form of fluid-dynamic kinetic energy;

said energy harvesting means further including energy conversion means for converting at least some of said net work into energy in a desired form for at least one of transmission, storage, processing and use;

said energy conversion means including an annular electromagnetic generator located in a fourth annular volume that is topologically coaxial with said annular volume; wherein said energy harvesting means including said annular electromagnetic generator, is connected to plural vertical-load-carrying structural members arranged in sequence in a second annular volume that is topologically coaxial with said annular volume, said plural vertical-load-carrying structural members comprising plural separated elongated structural members spaced around said second annular volume; wherein each said elongated structural member comprises at least one of a cable, a stretchable cord, a pivoting structural member, a post and a guy wire; and wherein each said elongated structural member has a length less than half the height of said airfoil means and is capable of carrying some tension loading in a circumferential direction associated with circumferential forces between (i) revolving upper structure of said revolving overhead windmill and (ii) nonrevolving lower structure of said revolving overhead windmill.

4. The revolving overhead windmill of claim 1, wherein said control system means utilizes actuator means that acts on at least one of (i) said airfoil means and (ii) a control surface connected to at least one of said airfoil means and a trailing edge flap, which trailing edge flap is connected to said airfoil means and (iii) a control tab;

and wherein said actuator means utilizes at least one of electrical actuation and electro-mechanical actuation and electro-hydraulic actuation and hydraulic actuation and pneumatic actuation and magnetic actuation and piezoelectric actuation and thermal actuation and shape memory alloy actuation.

5. The revolving overhead windmill of claim 1, wherein said buoyant support means utilizes at least one of (i) a buoyancy force from fluid displacement comprising displacement of water utilizing, an underwater float member, and (ii) a buoyancy force from fluid displacement comprising displacement of air utilizing a lifting gas chamber.

6. The revolving overhead windmill of claim 1,
wherein said vertical-load-carrying structural members include at least one of (i) a post and (ii) a truss and (iii) an annular truss and (iv) a floating annular truss and (v) a pivoting structural member and (vi) a cable and (vii) a stretchable cord and (viii) a damper and (ix) a shock absorber.

7. The revolving overhead windmill of claim 1,
wherein said energy conversion means for converting at least some of said net work into energy in a desired form for at least one of transmission, storage, processing and use, comprises an annular electromagnetic generator located in a fourth annular volume that is topologically coaxial with said annular volume, which annular electromagnetic generator is configured to convert said net work into electrical energy.

8. The revolving overhead windmill of claim 1,
further comprising an electrical device supported by structure in said airfoil means, which electrical device comprises at least one of a battery and a sensor and an electrical wire and a signal wire and a an electro-optical component and a computer and a light and a display and a communication device and a human interface device and a photovoltaic electrical power source device and an air turbine electrical power source device.

9. The revolving overhead windmill of claim 1,
wherein said revolving overhead windmill includes plural modular structural members and further includes fastener means for detachably connecting adjacent modular structural members to enable at least one of assembly and maintenance and inspection and service and repair and replacement, and further includes an access space for at least one of a human and a robot and a tool and a camera to be in said access space to at least one of facilitate and perform said at least one of assembly and maintenance and inspection and service and repair and replacement.

10. The revolving overhead windmill of claim 2,
wherein said wave load reduction means are contained in vertical load reacting means for reacting vertical loads, said vertical loads comprising at least one of airfoil means weight loads and buoyant support means buoyancy loads, said vertical load reacting means comprising plural vertical-load-carrying structural members arranged in sequence in a second annular volume that is topologically coaxial with said annular volume.

11. The revolving overhead windmill of claim 2,
wherein said load reduction elements include at least one of (i) a damper and (ii) a shock absorber and (iii) a pivoting structural member and (iv) a flexible structural member and (v) a stretchable cord and (vi) a cable.

12. The revolving overhead windmill of claim 2,
wherein said wave load reduction means comprises water surface penetrating members with a total cross-sectional area on the plane of said water surface when there are no waves, that is less than a corresponding total cross-sectional area that would occur for said rigid half-submerged toroidal ring on the plane of said water surface when there are no waves.

13. The revolving overhead windmill of claim 12,
wherein said water surface penetrating members collectively include at least one of (i) a post and (ii) a truss and (iii) an annular truss and (iv) a floating annular truss.

14. The revolving overhead windmill of claim 2,
wherein said buoyant support means includes utilizes a buoyancy force from fluid displacement comprising displacement of water utilizing an underwater float member, and further comprising buoyancy control means for varying said buoyancy force by pumping water ballast between a water tank and the body of water below said water surface.

15. The revolving overhead windmill of claim 2,
further comprising protection means for reducing risk of damage to said revolving overhead windmill from an environmental threat, wherein said environmental threat comprises at least one of a lightning strike and an electromagnetic energy threat and a hurricane and a typhoon and a cyclone and a storm and a tsunami and a seismic sea wave and a tidal wave and a tidal bore and a large sea wave and an earthquake and volcanic activity and hail and a rainstorm and a snowstorm; and wherein said protection means comprises at least one of a grounding wire, an electromagnetic threat shielding layer, means for limiting revolutions per minute of said plural airfoil means over said cycle of substantially periodic motion, means for commanding said plural airfoil means to a feathered condition, motion limiting means for protecting bearing members that normally enable said cycle of substantially periodic motion, means for elevating said plural airfoil means to an increased elevation above said water surface, and tether load reduction means for reducing loads consequent to said environmental threat acting on said revolving overhead windmill from at least one tether connecting said revolving overhead windmill to said underwater ground surface.

16. The revolving overhead windmill of claim 2,
further comprising position-keeping means for maintaining said revolving overhead windmill substantially within a desired geographic envelope, which position-keeping means includes at least one of a tether or cable and an anchor fastened to the underwater ground surface.

17. The revolving overhead windmill of claim 2,
wherein a portion of said revolving overhead windmill that is supported by said buoyancy force, has a center of gravity location that is below a metacenter associated with said buoyancy force provided by said buoyant support means.

18. The revolving overhead windmill of claim 1,
said energy conversion means including at least one of (i) an annular electromagnetic generator located in a fourth annular volume that is topologically coaxial with said annular volume, and (ii) an electrical generator using an electromagnet and (iii) an induction generator and (iv) a doubly fed induction generator and (v) a field excited synchronous generator and (vi) a gear-driven generator and (vii) a direct-drive generator and (viii) an AC generator and (ix) a multiphase AC generator and (x) a DC generator.

19. The revolving overhead windmill of claim 2,
said energy conversion means including at least one of (i) an annular electromagnetic generator located in a fourth annular volume that is topologically coaxial with said annular volume, and (ii) an electrical generator using an electromagnet and (iii) an induction generator and (iv) a doubly fed induction generator and (v) a field excited synchronous generator and (vi) a gear-driven generator and (vii) a direct-drive generator and (viii) an AC generator and (ix) a multiphase AC generator and (x) a DC generator.

20. The revolving overhead windmill of claim 3,
wherein said annular electromagnetic generator comprises at least one of (i) a permanent magnet generator and (ii) a permanent magnet synchronous generator and (iii) a pancake permanent magnet generator and (iv) a direct drive permanent magnet generator with an ironless stator core and (v) a permanent magnet generator with at least one of rigid wheels and rigid rollers and rigid ball bearings that serve as means for maintaining a small and substantially constant air gap between stator and rotor members.

* * * * *